United States Patent
Kim et al.

(10) Patent No.: US 9,502,923 B2
(45) Date of Patent: Nov. 22, 2016

(54) WIRELESS POWER TRANSMISSION APPARATUS AND METHOD AND WIRELESS POWER RECEPTION APPARATUS

(71) Applicant: Samsung Electronics Co., Ltd., Suwon-si (KR)

(72) Inventors: Nam Yun Kim, Seoul (KR); Sang Wook Kwon, Seongnam-si (KR); Ki Young Kim, Yongin-si (KR); Yun Kwon Park, Dongducheon-si (KR); Chi Hyung Ahn, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 202 days.

(21) Appl. No.: 14/025,516

(22) Filed: Sep. 12, 2013

(65) Prior Publication Data

US 2014/0084858 A1    Mar. 27, 2014

(30) Foreign Application Priority Data

Sep. 12, 2012 (KR) .......................... 10-2012-0100867

(51) Int. Cl.
*H02J 7/00* (2006.01)
*H02J 7/02* (2016.01)
*H02J 5/00* (2016.01)

(52) U.S. Cl.
CPC ............... *H02J 7/025* (2013.01); *H02J 5/005* (2013.01); *H02J 7/007* (2013.01); *H02J 7/0029* (2013.01)

(58) Field of Classification Search
USPC ....................................................... 320/108
See application file for complete search history.

(56) References Cited

U.S. PATENT DOCUMENTS

| | | | |
|---|---|---|---|
| 7,952,324 B2 | 5/2011 | Cheng et al. | |
| 8,316,251 B2 | 11/2012 | Craine | |
| 8,373,385 B2* | 2/2013 | Takagi | H02J 7/025 320/108 |
| 2012/0049641 A1 | 3/2012 | Urano | |
| 2013/0285605 A1* | 10/2013 | Partovi | 320/108 |

FOREIGN PATENT DOCUMENTS

| | | |
|---|---|---|
| JP | 2010-268665 A | 11/2010 |
| JP | 2011-87433 A | 4/2011 |
| JP | 2011-135760 A | 7/2011 |
| JP | 2011-139621 A | 7/2011 |
| JP | 2012-34546 A | 2/2012 |
| JP | 2012-44857 A | 3/2012 |
| JP | 2012-50209 A | 3/2012 |
| JP | 2012-60850 A | 3/2012 |
| JP | 2012-65484 A | 3/2012 |
| KR | 10-2011-0116854 A | 10/2011 |
| KR | 10-2011-0128277 A | 11/2011 |
| KR | 10-2012-0010652 A | 2/2012 |

* cited by examiner

Primary Examiner — Eric Lee
(74) Attorney, Agent, or Firm — NSIP Law

(57) ABSTRACT

A wireless power transmission apparatus includes a measurer configured to measure a value of a current flowing in a source resonator, a communication unit configured to receive a value of a charging current of a battery from a wireless power reception apparatus, and a power controller configured to control an amount of power to be transmitted by the source resonator based on either one or both of the value of the current measured by the measurer and the value of the charging current received by the communication unit. The value of the charging current of the battery varies as the battery is charged.

19 Claims, 22 Drawing Sheets

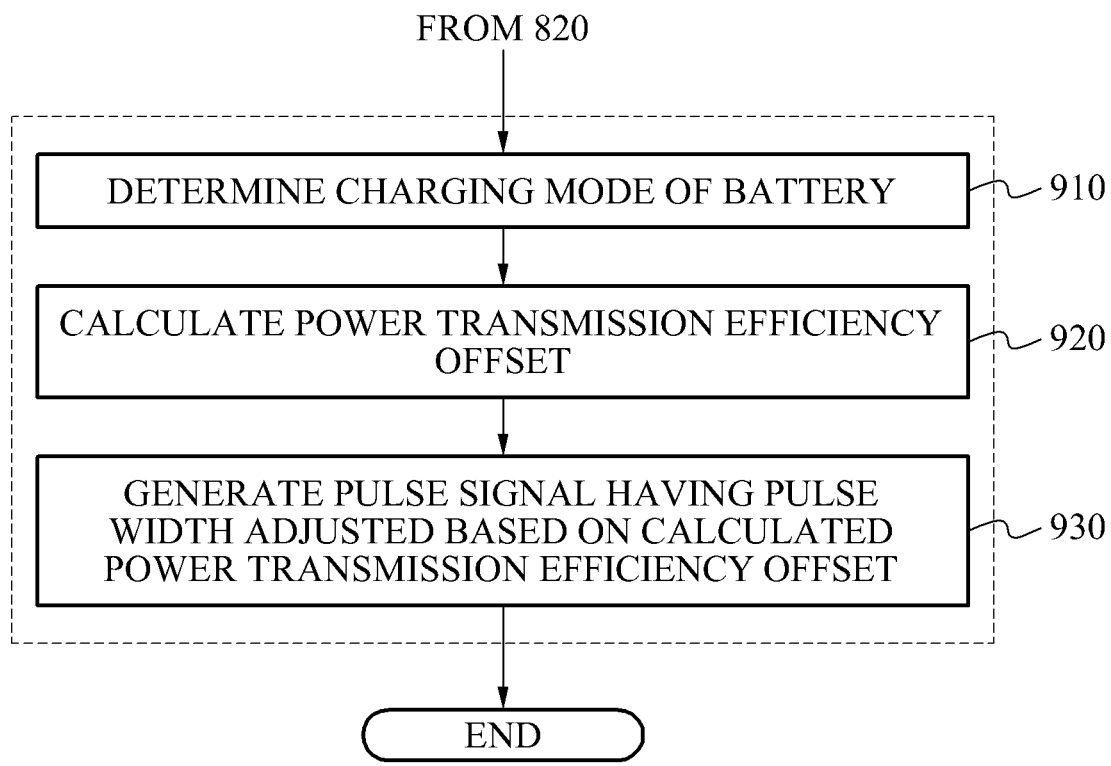

WIRELESS POWER TRANSMISSION APPARATUS AND METHOD AND WIRELESS POWER RECEPTION APPARATUS

CROSS-REFERENCE TO RELATED APPLICATIONS

This application claims the benefit under 35 USC 119(a) of Korean Patent Application No. 10-2012-0100867 filed on Sep. 12, 2012, in the Korean Intellectual Property Office, the entire disclosure of which is incorporated herein by reference for all purposes.

BACKGROUND

1. Field

The following description relates to an apparatus and method for transmitting power wirelessly, and an apparatus for receiving power wirelessly.

2. Description of Related Art

Research on wireless power transmission has been conducted to overcome an increase in the inconvenience of wired power supplies and the limited capacity of conventional batteries due to a rapid increase in various electronic devices including electric vehicles, mobile devices, and the like. One wireless power transmission technology uses resonance characteristics of radio-frequency (RF) devices. A wireless power transmission system using resonance characteristics may include a source configured to supply power, and a target configured to receive the supplied power.

SUMMARY

In one general aspect, a wireless power transmission apparatus includes a measurer configured to measure a value of a current flowing in a source resonator; a communication unit configured to receive a value of a charging current of a battery from a wireless power reception apparatus; and a power controller configured to control an amount of power to be transmitted by the source resonator based on either one or both of the value of the current measured by the measurer and the value of the charging current received by the communication unit; wherein the value of the charging current of the battery varies as the battery is charged.

The power controller may include a charging mode determiner configured to determine a charging mode of the battery based on a change in the value of the charging current received by the communication unit; and a pulse signal generator configured to generate a pulse signal having a pulse width adjusted based on the determined charging mode of the battery.

The charging mode determiner may be further configured to determine whether the charging mode of the battery is a constant current (CC) mode in which the value of the charging current of the battery is constant, or a constant voltage (CV) mode in which the value of the charging current of the battery is variable and a value of a charging voltage of the battery is constant.

The apparatus may further include an alternating current-to-direct current (AC/DC) converter configured to convert an AC power supplied from a power supply to a DC power based on the pulse width of the pulse signal; and a DC-to-AC (DC/AC) converter configured to convert the DC power to an AC power based on a resonant frequency of the source resonator.

The communication unit may be further configured to receive, from the wireless power reception apparatus, a value of a current flowing in a target resonator; and the power controller may include an offset calculator configured to calculate a power transmission efficiency offset by comparing the value of the current measured by the measurer with the value of the current flowing in the target resonator received by the communication unit, and calculating the power transmission efficiency offset based on a result of the comparing; and a pulse signal generator configured to generate a pulse signal having a pulse width adjusted based on the calculated power transmission efficiency offset.

The communication unit may be further configured to receive, from the wireless power reception apparatus, a value of a current flowing in a target resonator; and the power controller may include a charging mode determiner configured to determine a charging mode of the battery based on a change in the value of the charging current received by the communication unit; an offset calculator configured to calculate a power transmission efficiency offset by comparing the value of the current measured by the measurer with the value of the current flowing in the target resonator received by the communication unit, and calculating the power transmission efficiency offset based on a result of the comparing; and a pulse signal generator configured to generate a pulse signal having a pulse width adjusted based on the determined charging mode of the battery and the calculated power transmission efficiency offset.

The apparatus may further include a first comparator configured to compare the value of the current measured by the measurer with a reference current value; and a second comparator configured to compare the value of the current flowing in the target resonator received by the communication unit with the reference current value; wherein the pulse signal generator may be further configured to adjust the pulse width of the pulse signal based on a difference between a result of the comparing by the first comparator and a result of the comparing by the second comparator.

The communication unit may be further configured to receive, from the wireless power reception apparatus, a value of a current flowing in a rectifier as the value of the charging current of the battery.

The wireless power reception apparatus may be configured to receive power from a target resonator; the source resonator may include a coil; the target resonator may include a coil; and a ratio of a number of turns of the coil of the source resonator to a number of turns of the coil of the target resonator is a 1:1 ratio.

In another general aspect, a wireless power reception apparatus includes a rectifier configured to rectify an alternating current (AC) power received from a wireless power transmission apparatus by a target resonator through a mutual resonance with a source resonator to a direct current (DC) power; a measurer configured to measure a value of a current flowing in the target resonator; and a communication unit configured to transmit the value of the current measured by the measurer to the wireless power transmission apparatus.

The measurer may be further configured to measure a value of a current flowing from the rectifier into a battery; and the communication unit may be further configured to transmit the value of the current flowing into the battery to the wireless power transmission apparatus.

The apparatus may further include a controller configured to determine a charging mode of the battery based on a change in the value of the current flowing into the battery.

The communication unit may be further configured to communicate with the wireless power transmission apparatus using either one or both of an in-band communication scheme using a resonant frequency of the target resonator and an out-band communication scheme using a communication frequency differing from the resonant frequency.

In another general aspect, a wireless power transmission method includes measuring a value of a current flowing in a source resonator; receiving a value of a charging current of a battery from a wireless power reception apparatus; and controlling an amount of power to be transmitted by the source resonator based on either one or both of the measured value of the current and the received value of the charging current; wherein the value of the charging current of the battery varies as the battery is charged.

The controlling may include determining a charging mode of the battery based on a change in the received value of the charging current; and generating a pulse signal having a pulse width adjusted based on the determined charging mode of the battery.

The method may further include converting an alternating current (AC) power supplied from a power supply to a direct current (DC) power based on the pulse width of the pulse signal; and converting the DC power to an AC power based on a resonant frequency of the source resonator.

The receiving may include receiving, from the wireless power reception apparatus, a value of a current flowing in a target resonator; and the controlling may include calculating a power transmission efficiency offset by comparing the measured value of the current with the received value of the current flowing in the target resonator, and calculating the power transmission efficiency offset based on a result of the comparing; and generating a pulse signal having a pulse width adjusted based on the calculated power transmission efficiency offset.

The receiving may include receiving, from the wireless power reception apparatus, a value of a current flowing in a target resonator; and the controlling may include determining a charging mode of the battery based on a change in the received value of the charging current; calculating a power transmission efficiency offset by comparing the measured value of the current with the received value of the current flowing in the target resonator, and calculating the power transmission efficiency offset based on a result of the comparing; and generating a pulse signal having a pulse width adjusted based on the determined charging mode of the battery and the calculated power transmission efficiency offset.

In another general aspect, a wireless power transmission apparatus includes a measurer configured to measure information indicative of an amount of power being transmitted by a source resonator; a communication unit configured to receive, from a wireless power reception apparatus, measured information indicative of an amount of power being consumed by a load powered by the wireless reception apparatus; and a controller configured to control an amount of power to be transmitted by the source resonator based on either one or both of the information measured by the measurer and the measured information received by the communication unit.

The controller may be further configured to control the amount of power to be transmitted by the source resonator based on a difference between the information measured by the measurer and the measured information received by the communication unit.

Other features and aspects will be apparent from the following detailed description, the drawings, and the claims.

BRIEF DESCRIPTION OF THE DRAWINGS

FIG. 9 is a flowchart illustrating another example of a wireless power transmission method.

DETAILED DESCRIPTION

Figure 1:
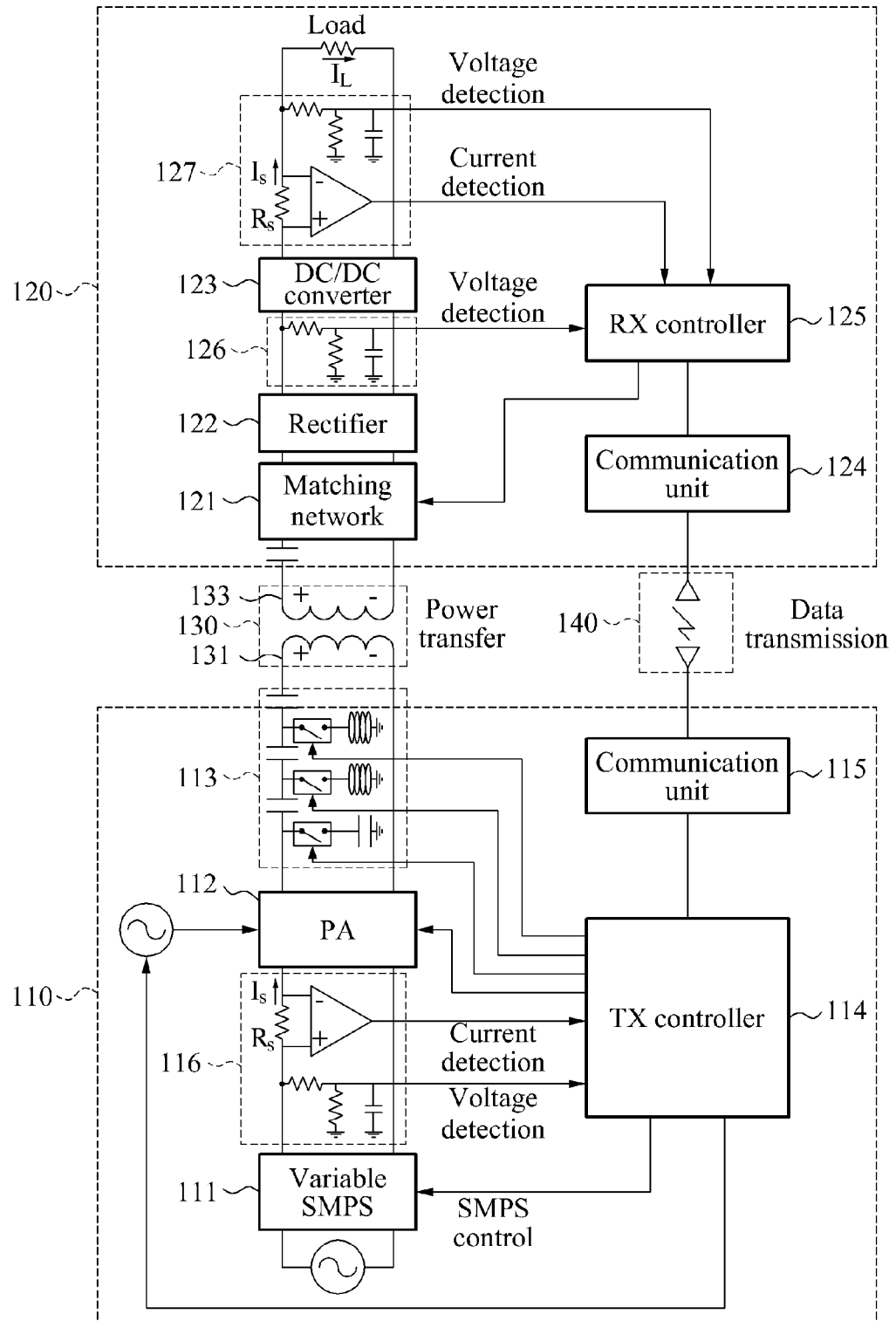
FIG. 1 is a diagram illustrating an example of a wireless power transmission system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

Communication between a source and a target may be performed using either one or both of an in-band communication scheme and an out-band communication scheme. The in-band communication scheme refers to communication performed between the source and the target in the same frequency band used for power transmission. The out-band communication scheme refers to communication performed between the source and the target in a separate frequency band different from the frequency band used for power transmission.

FIG. 1 is a diagram illustrating an example of a wireless power transmission system. Referring to FIG. 1, the wireless power transmission system includes a source 110 and a target 120. The source 110 is a device configured to supply wireless power, and may be any electronic device capable of supplying power, for example, a pad, a terminal, a television (TV), a medical device, or an electric vehicle. The target 120 is a device configured to receive supplied wireless power, and may be any electronic device requiring power, for example, a pad, a terminal, a tablet personal computer (PC), a medical device, or an electric vehicle.

The source 110 includes a variable switching mode power supply (SMPS) 111, a power amplifier (PA) 112, a matching network 113, a transmission (TX) controller 114 (for example, TX control logic), a communication unit 115, and a power detector 116.

The variable SMPS 111 generates a direct current (DC) voltage by switching an alternating current (AC) voltage having a frequency in a band of tens of hertz (Hz) output from a power supply. The variable SMPS 111 may output a DC voltage having a predetermined level, or may output a DC voltage having a level that may be adjusted under control of the TX controller 114.

The variable SMPS 111 may control its output voltage based on a level of power output from the PA 112 so that the PA 112 may operate in a saturation region with high efficiency at all times, and may enable a maximum efficiency to be maintained at all levels of the output power of the PA 112. The PA 112 may have, for example, class-E features.

For example, if a fixed SMPS is used instead of the variable SMPS 111, a variable DC-to-DC (DC/DC) converter needs to be provided. In this example, the fixed SMPS outputs a fixed voltage to the variable DC/DC converter, and the variable DC/DC converter controls its output voltage based on the level of the power output from the PA 112 so that the PA 112 may operate in the saturation region with high efficiency at all times, and may enable the maximum efficiency to be maintained at all levels of the output power of the PA 112.

The power detector 116 detects an output current and an output voltage of the variable SMPS 111, and provides information on the detected current and the detected voltage to the TX controller 114. Additionally, the power detector 116 may detect an input current and an input voltage of the PA 112.

The PA 112 generates power by converting DC voltage having a predetermined level to an AC voltage using a switching pulse signal having a frequency in a band of a few megahertz (MHz) to tens of MHz output from a signal generator. Accordingly, the PA 112 may convert the DC voltage supplied to the PA 112 by the variable SMPS 111 to an AC voltage having a reference resonant frequency $F_{Ref}$, and may generate communication power used for communication, or charging power used for charging. The communication power and the charging power may be used in a plurality of targets.

The communication power may be a low power of 0.1 milliwatt (mW) to 1 mW. The charging power may be a high power of 1 mW to 200 watt (W) that is consumed by a device load of a target. In various examples described herein, the term "charging" may refer to supplying power to a unit or element that is configured to charge a battery or other rechargeable device. Additionally, the term "charging" may refer to supplying power to a unit or element that is configured to consume power. The units or elements may include, for example, batteries, displays, sound output circuits, main processors, and various sensors.

Also, the term "reference resonant frequency" refers to a resonant frequency that is used by the source 110. Additionally, the term "tracking frequency" refers to a resonant frequency that is adjusted according to a preset scheme.

The TX controller 114 may detect a reflected wave of the communication power or the charging power, and may detect mismatching that may occur between a target resonator 133 and the source resonator 131 based on the detected reflected wave. To detect the mismatching, for example, the TX controller 114 may detect an envelope of the reflected wave, a power amount of the reflected wave, or any other characteristic of the reflected wave that is affected by mismatching.

The matching network 113 compensates for impedance mismatching between the source resonator 131 and the target resonator 133 to achieve optimal matching under the control of the TX controller 114. The matching network 113 includes at least one capacitor and at least one inductor each connected to a switch controlled by the TX controller 114.

The TX controller 114 may calculate a voltage standing wave ratio (VSWR) based on a voltage level of the reflected wave and a level of an output voltage of the source resonator 131 or the PA 112. In one example, if the VSWR is greater than a predetermined value, the TX controller 114 may determine that mismatching is detected.

In another example, if the VSWR is greater than the predetermined value, the TX controller 114 may calculate a power transmission efficiency for each of N tracking frequencies, determine a tracking frequency $F_{Best}$ having the best power transmission efficiency among the N tracking frequencies, and adjust the reference resonant frequency $F_{Ref}$ to the tracking frequency $F_{Best}$. The N tracking frequencies may be set in advance.

The TX controller 114 may adjust a frequency of the switching pulse signal used by the PA 112. Under the control of the TX controller 114, the frequency of the switching pulse signal may be determined. For example, by controlling the PA 112, the TX controller 114 may generate a modulation signal to be transmitted to the target 120. In other words, the TX controller 114 may transmit a variety of data to the target 120 using in-band communication. The TX controller 114 may detect a reflected wave, and may demodulate a signal received from the target 120 from an envelope of the detected reflected wave.

The TX controller 114 may generate a modulated signal for in-band communication using various methods. For example, the TX controller 114 may generate the modulation signal by turning on or off the switching pulse signal used by the PA 112, by performing delta-sigma modulation, or by any other modulation method known to one of ordinary skill in the art. Additionally, the TX controller 114 may generate a pulse-width modulation (PWM) signal having a predetermined envelope.

The TX controller 114 may determine an initial wireless power that is to be transmitted to the target 120 based on a change in a temperature of the source 110, a battery state of the target 120, a change in an amount of power received at the target 120, and/or a change in a temperature of the target 120.

The source 110 may further include a temperature measurement sensor (not illustrated) configured to detect a change in temperature of the source 110. The source 110 may receive from the target 120 information regarding the battery state of the target 120, the change in the amount of power received at the target 120, and/or the change in the temperature of the target 120 via communication with the target 120. The source 110 may detect the change in the temperature of the target 120 based on the information received from the target 120.

The TX controller 114 may adjust a voltage supplied to the PA 112 using a lookup table. The lookup table may be used to store a level of the voltage to be supplied to the PA 112 based on the change in the temperature of the source 110. For example, when the temperature of the source 110 rises, the TX controller 114 may lower the level of the voltage to be supplied to the PA 112 by controlling the variable SMPS 111.

The communication unit 115 performs out-band communication using a separate communication channel. The communication unit 115 may include a communication module, such as a ZigBee module, a Bluetooth module, or any other communication module known to one of ordinary skill in the art that the communication unit 115 may use to transmit data 140 to the target 120 via the out-band communication.

The source resonator 131 transfers electromagnetic energy 130 to the target resonator 133. For example, the source resonator 131 may transfer the communication power or the charging power to the target 120 via magnetic coupling with the target resonator 133.

As illustrated in FIG. 1, the target 120 includes a matching network 121, a rectifier 122, a DC/DC converter 123, a communication unit 124, a reception (RX) controller 125 (for example, RX control logic), a voltage detector 126, and a power detector 127.

The target resonator 133 receives the electromagnetic energy 130 from the source resonator 131. For example, the target resonator 133 may receive the communication power or the charging power from the source 110 via the magnetic coupling with the source resonator 131. Additionally, the target resonator 133 may receive data from the source 110 via the in-band communication.

The target resonator 133 may receive the initial wireless power that is determined by the TX controller 114 based on the change in the temperature of the source 110, the battery state of the target 120, the change in the amount of power received at the target 120, and/or the change in the temperature of the target 120.

The matching network 121 matches an input impedance viewed from the source 110 to an output impedance viewed from a load of the target 120. The matching network 121 may be configured to have at least capacitor and at least one inductor.

The rectifier 122 generates a DC voltage by rectifying an AC voltage received from the target resonator 133.

The DC/DC converter 123 may adjust a level of the DC voltage output from the rectifier 122 based on a capacity required by the load. For example, the DC/DC converter 123 may adjust the level of the DC voltage output from the rectifier 122 to a level in a range from 3 volts (V) to 10 V.

The voltage detector 126 detects a voltage of an input terminal of the DC/DC converter 123, and the power detector 127 detects a current and a voltage of an output terminal of the DC/DC converter 123. The detected voltage of the input terminal may be used to calculate a power transmission efficiency of power received from the source 110. The detected current and the detected voltage of the output terminal may be used by the RX controller 125 to calculate an amount of power actually transferred to the load. The TX controller 114 of the source 110 may calculate an amount of power that needs to be transmitted by the source 110 to the target 120 based on a power required by the load and the power actually transferred to the load.

If the amount of power actually transferred to the load calculated by the RX controller 125 is transmitted to the source 110 by the communication unit 124, the source 110 may calculate the amount of power that needs to be transmitted to the target 120.

The RX controller 125 may perform in-band communication to transmit or receive data using a resonant frequency. During the in-band communication, the RX controller 125 may demodulate a received signal by detecting a signal between the target resonator 133 and the rectifier 122, or detecting an output signal of the rectifier 122, and demodulating the detected signal. In other words, the RX controller 125 may demodulate a message received via the in-band communication. Additionally, the RX controller 125 may adjust an impedance of the target resonator 133 using the matching network 121 to modulate a signal to be transmitted to the source 110. For example, the RX controller 125 may adjust the matching unit 121 to increase the impedance of the target resonator 133 so that a reflected wave may be detected by the TX controller 114 of the source 110. Depending on whether the reflected wave is detected, the TX controller 114 may detect a first value, for example, a binary number "0," or a second value, for example, a binary number "1." For example, when the reflected wave is detected, the TX controller 114 may detect "0", and when the reflected wave is not detected, the TX controller 114 may detect "1". Alternatively, when the reflected wave is detected, the TX controller 114 may detect "1", and when the reflected wave is not detected, the TX controller 114 may detect "0".

The communication unit 124 may transmit a response message to the communication unit 115 of the source 110. For example, the response message may include any one or any combination of a "type of a corresponding target," "information about a manufacturer of a corresponding target," "a model name of a corresponding target," a "battery type of a corresponding target," a "scheme of charging a corresponding target," an "impedance value of a load of a corresponding target," "information on characteristics of a target resonator of a corresponding target," "information on a frequency band used by a corresponding target," an "amount of a power consumed by a corresponding target," an "identifier (ID) of a corresponding target," "information on a version or a standard of a corresponding target," and any other information about the target 120.

The communication unit 124 performs out-band communication that employs a separate communication channel. For example, the communication unit 124 may include a communication module, such as a ZigBee module, a Bluetooth module, or any other communication module known to one of ordinary skill in the art that the communication unit 124 may use to transmit or receive the data 140 to or from the source 110 via the out-band communication.

The communication unit 124 may receive a wake-up request message from the source 110, and the power detector 127 may detect an amount of power received by the target resonator 133. The communication unit 124 may transmit to the source 110 information on the detected amount of the power. Information on the detected amount of the power may include, for example, an input voltage value and an input current value of the rectifier 122, an output voltage value and an output current value of the rectifier 122, an output voltage value and an output current value of the DC/DC converter 123, and any other information about the detected amount of the power.

Figure 2:
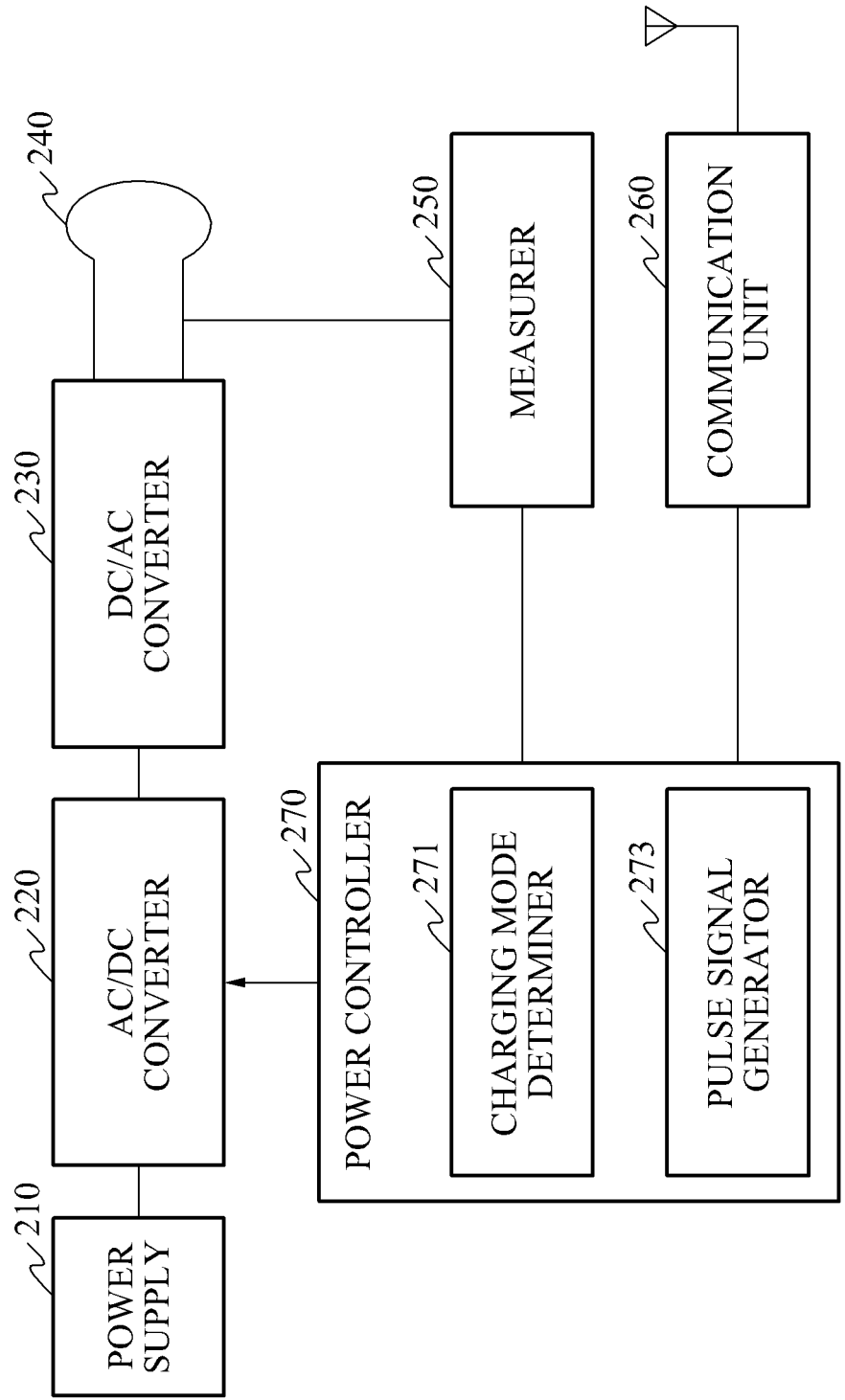
FIG. 2 is a block diagram illustrating an example of a wireless power transmission apparatus.

FIG. 2 is a block diagram illustrating an example of a wireless power transmission apparatus. Referring to FIG. 2, the wireless power transmission apparatus includes a power supply 210, an AC/DC converter 220, a DC/AC converter 230, a source resonator 240, a measurer 250, a communication unit 260, and a power controller 270.

The AC/DC converter 220 converts an AC power supplied from the power supply 210 to a DC power based on a pulse width of a pulse signal generated by the power controller 270.

The DC/AC converter 230 converts the DC power converted by the AC/DC converter 220 to an AC power based on a resonant frequency of the source resonator 240. The DC/AC converter 230 may amplify the AC power. An amount of the AC power to be amplified may be determined based on an amount of power to be transmitted by the wireless power transmission apparatus.

The source resonator 240 transmits the AC power output from the DC/AC converter 230 via a mutual resonance. In this example, the mutual resonance may occur between the source resonator 240 and a target resonator of a wireless power reception apparatus (not shown in FIG. 2, but see the target resonator 510 of the wireless power reception apparatus in FIG. 5). When a resonant frequency band of the source resonator 240 matches a resonant frequency band of the target resonator, a mutual resonance may occur between the source resonator 240 and the target resonator.

The measurer 250 measures a value of a current flowing in the source resonator 240. The AC power generated by the DC/AC converter 230 is transferred to the source resonator 240. The value of the current measured by the measurer 250 may be compared with an expected amount of power to be controlled by the power controller 270. In addition, a result in which efficiencies of the AC/DC converter 220 and the DC/AC converter 230 are reflected may be reflected in the measured value of the current.

The communication unit 260 receives a value of a charging current of a battery from the wireless power reception apparatus. In this example, the value of the charging current of the battery varies as the battery of the wireless power reception apparatus is charged. The battery of the wireless power reception apparatus may be charged using power transmitted by the source resonator 240. As the battery is charged, a value of load of the battery may increase. When the value of load of the battery increases, a value of a charging current used to charge the battery may be changed. The communication unit 260 may receive the varying value of the charging current from the wireless power reception apparatus.

The communication unit 260 may communicate with the wireless power reception apparatus using either one or both of an in-band communication scheme using a resonant frequency of the source resonator 240 and an out-band communication scheme using a communication frequency differing from the resonant frequency of the source resonator 240.

The power controller 270 controls an amount of power to be transmitted by the source resonator 240 based on either one or both of the value of the current measured by the measurer 250 and the value of the charging current received by the communication unit 260.

The value of the charging current received by the communication unit 260 may be used for determining a charging mode of the battery. In addition, a value of a current flowing in the target resonator received by the communication unit 260 may be compared with the value of the current measured by the measurer 250, and used for calculating a power transmission efficiency offset or a power transmission efficiency.

The value of the current measured by the measurer 250 may be used as a reference value for calculating the power transmission efficiency. In addition, the value of the current measured by the measurer 250 may be used for calculating the power transmission efficiency offset and an internal efficiency of a process of generating an AC power performed by the AC/DC converter 220, the DC/AC converter 230, and the power controller 270.

For example, the power controller 270 may control an amount of power so that a current of 10 amperes (A) is supposed to flow in the source resonator 240. When an actual current passing through the AC/DC converter 220 and the DC/AC converter 230 and flowing in the source resonator 240 is 9 A, an internal efficiency may be 90% and power transmission efficiency offset may be 1 A. The power controller 270 may control the amount of power to be transmitted by the source resonator 240 based on the internal efficiency and the power transmission efficiency offset.

The power controller 270 includes a charging mode determiner 271 and a pulse signal generator 273.

The charging mode determiner 271 determines a charging mode of the battery based on a change in the value of the charging current received by the communication unit 260. The charging mode of the battery may be a constant current (CC) mode in which the value of the charging current of the battery is constant, or a constant voltage (CV) mode in which the value of the charging current of the battery is variable and a value of a charging voltage of the battery is constant.

The pulse signal generator 273 generates a pulse signal having a pulse width adjusted based on the determined charging mode of the battery. For example, the pulse signal generator 273 may adjust the pulse width of the pulse signal by performing pulse width modulation (PWM). For example, the pulse signal generator 273 may increase a pulse width of a pulse signal in a single cycle when the charging mode of the battery is determined to be the CC mode, thereby enabling a relatively large amount of power to be transferred by the source resonator 240 in the CC mode. In addition, the pulse signal generator 273 may decrease a pulse width of a pulse signal in a single cycle when the charging mode of the battery is determined to be the CV mode, thereby enabling a relatively small amount of power compared to the amount of power transferred in the CC mode to be transferred by the source resonator 240 in the CV mode.

The communication unit 260 may receive from the wireless power reception apparatus a value of a current flowing in the target resonator of the wireless power reception apparatus. The value of the current flowing in the target resonator may be used for calculating a power transmission efficiency of power to be transferred by the source resonator 240.

The communication unit 260 may receive from the wireless power reception apparatus a value of a current flowing in a rectifier (not shown in FIG. 2, but see the rectifier 520 in FIG. 5) of the wireless power reception apparatus. The value of the current flowing in the rectifier may be used for determining the charging mode of the battery.

The source resonator 240 and the target resonator may be resonators provided in a form of a coil. A ratio of a number of turns of the coil of the source resonator 240 to a number of turns of the coil of the target resonator may be a 1:1 ratio. In particular, the coils may be wound so that the ratio of the number of the turns of the coil of the source resonator 240 to the number of the turns of the coil of the target resonator is the 1:1 ratio.

A power transmission efficiency when the number of the turns of the coil of the source resonator 240 is the same as the number of the turns of the coil of the target resonator is higher than a power transmission efficiency when the number of the turns of the coil of the source resonator 240 is not the same as the number of the turns of the coil of the target resonator.

Figure 3:
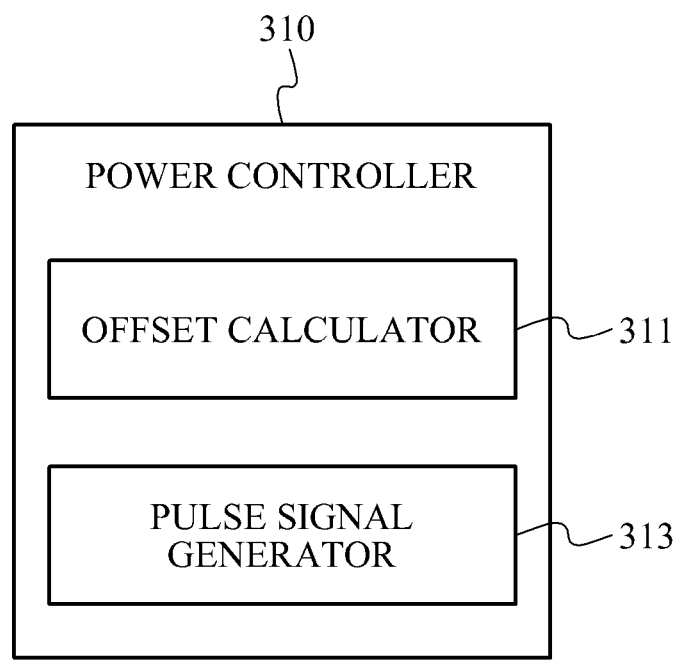
FIG. 3 is a block diagram illustrating an example of a power controller in a wireless power transmission apparatus.

FIG. 3 is a block diagram illustrating an example of a power controller 310 in a wireless power transmission apparatus. Referring to FIG. 3, the power controller 310 includes an offset calculator 311 and a pulse signal generator 313.

In contrast to the power controller 270 of FIG. 2, the power controller 310 includes the offset calculator 311 instead of the charging mode determiner 271. The rest of the power controller 310 is identical to the power controller 270 of FIG. 2. The operation of the power controller 310 will be described by referring to various elements shown in FIG. 2.

The offset calculator 311 calculates a power transmission efficiency offset by comparing the value of the current measured by the measurer 250 with the value of the current flowing in the target resonator received by the communication unit 260, and calculating the power transmission efficiency offset based on a result of the comparing. The value of the current measured by the measurer 250 may be a value of a current flowing in the source resonator 240. The communication unit 260 receives the value of the current flowing in the target resonator. Accordingly, the power transmission efficiency offset may be calculated. In particular, the power transmission efficiency offset may be calculated based on a difference between the value of the current flowing in the source resonator 240 and the value of the current flowing in the target resonator.

The pulse signal generator 313 generates a pulse signal having a pulse width adjusted based on the calculated power transmission efficiency offset. In theory, the entire amount of power transmitted by the source resonator 240 may be transferred to the target resonator. However, in view of an environment in which the power is transmitted, a number of factors may cause a loss of power. Accordingly, an amount of power to be transmitted by the source resonator 240 may be adjusted in view of an actual amount of power that is transferred to the target resonator.

For example, when a power transmission efficiency offset is relatively great, indicating a relatively great loss of power, the pulse signal generator 313 may generate a pulse signal having a pulse width that is relatively wide in a single cycle. Conversely, when a power transmission efficiency offset is relatively small, indicating a relatively small loss of power, the pulse signal generator 313 may generate a pulse signal having a pulse width that is relatively narrow in a single cycle.

Figure 4:
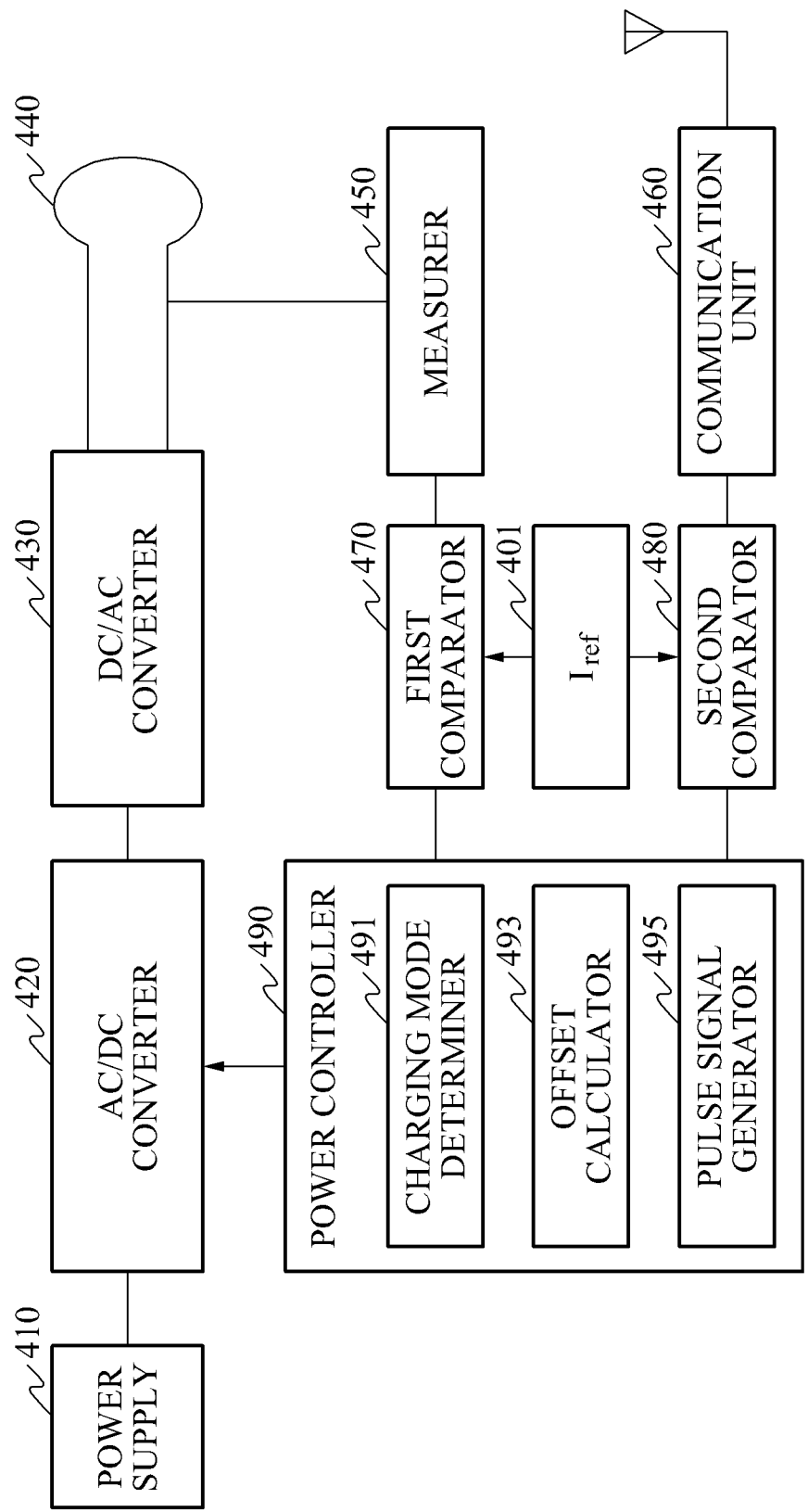
FIG. 4 is a block diagram illustrating another example of a wireless power transmission apparatus.

FIG. 4 is a block diagram illustrating another example of a wireless power transmission apparatus. Referring to FIG. 4, the wireless power transmission apparatus includes a power supply 410, an AC/DC converter 420, a DC/AC converter 430, a source resonator 440, a measurer 450, a communication unit 460, a first comparator 470, a second comparator 480, and a power controller 490.

The AC/DC converter 420 converts an AC power supplied from the power supply 410 to a DC power based on a pulse width of a pulse signal generated by the power controller 490.

The DC/AC converter 430 converts the DC power converted by the AC/DC converter 420 to an AC power based on a resonant frequency of the source resonator 440. The DC/AC converter 430 may amplify the AC power. An amount of the AC power to be amplified may be determined based on an amount of power to be transmitted by the wireless power transmission apparatus.

The source resonator 440 transmits the AC power output from the DC/AC converter 430 via a mutual resonance. In this example, the mutual resonance may occur between the source resonator 440 and a target resonator of a wireless power reception apparatus (not shown in FIG. 2, but see the target resonator 510 of the wireless power reception apparatus in FIG. 5). When a resonant frequency band of the source resonator 440 matches a resonant frequency band of the target resonator, a mutual resonance may occur between the source resonator 440 and the target resonator.

The measurer 450 measures a value of a current flowing in the source resonator 440. The AC power generated by the DC/AC converter 430 is transferred to the source resonator 440. The value of the current measured by the measurer 450 may be compared with an expected amount of power to be controlled by the power controller 490. In addition, a result in which efficiencies of the AC/DC converter 420 and the DC/AC converter 430 are reflected may be reflected in the measured value of the current.

The communication unit 460 receives a value of a charging current of a battery from the wireless power reception apparatus. In this example, the value of the charging current of the battery varies as the battery of the wireless power reception apparatus is charged. The battery of the wireless power reception apparatus may be charged using power transmitted by the source resonator 440. As the battery is charged, a value of load of the battery may increase. When the value of load of the battery increases, a value of a charging current used to charge the battery may be changed. The communication unit 460 may receive the varying value of the charging current from the wireless power reception apparatus.

The communication unit 460 may communicate with the wireless power reception apparatus using either one or both of an in-band communication scheme using a resonant frequency of the source resonator 440 and an out-band communication scheme using a communication frequency differing from the resonant frequency of the source resonator 440.

The communication unit 460 may receive from the wireless power reception apparatus a value of a current flowing in the target resonator of the wireless power reception apparatus. The value of the current flowing in the target resonator may be used for calculating a power transmission efficiency of power to be transferred by the source resonator 440.

The first comparator 470 compares the value of the current measured by the measurer 450 with a reference current value $I_{ref}$ 401. The reference current value $I_{ref}$ 401 may be set to a value of a current corresponding to an amount of power to be transmitted by the power controller 490 via the source resonator 440. The first comparator 470 transfers to the power controller 490 a difference between the value of the current measured by the measurer 450 and the reference current value $I_{ref}$ 401. The first comparator 470 may also transfer to the power controller 490 information indicating which one of the value of the current measured by the measurer 450 and the reference current value $I_{ref}$ 401 has a greater value. For example, the first comparator 470 may output a bit "1" when the current measured by the measurer 450 has a greater value than the reference current value $I_{ref}$ 401, and output a bit "0" when the reference current value $I_{ref}$ 401 has greater value than the current measured by the measurer 450.

The second comparator 480 compares the value of the current flowing in the target resonator received by the communication unit 460 with the reference current value $I_{ref}$ 401. The second comparator 480 transfers to the power controller 490 a difference between the value of the current flowing in the target resonator received by the communication unit 460 and the reference current value $I_{ref}$ 401. The second comparator 480 may also transfer to the power controller 490 information indicating which one of the value of the current flowing in the target resonator received by the communication unit 460 and the reference current value $I_{ref}$ 401 has a greater value. For example, the second comparator 480 may output a bit "1" when the current flowing in the target resonator received by the communication unit 460 has a greater value than the reference current value $I_{ref}$ 401, and output a bit "0" when the reference current value $I_{ref}$ 401 has greater than the current flowing in the target resonator received by the communication unit 460.

The power controller 490 controls an amount of power to be transmitted by the source resonator 440 based on either one or both of the value of the current received by the communication unit 460 and the value of the current measured by the measurer 450.

The power controller 490 includes a charging mode determiner 491, an offset calculator 493, and a pulse signal generator 495.

The charging mode determiner 491 determines a charging mode of the battery based on a change in the value of the charging current received by the communication unit 460. The charging mode of the battery may be a CC mode in which the value of the charging current of the battery is constant, or a CV mode in which the value of the charging current of the battery is variable and a value of a charging voltage of the battery is constant.

The offset calculator 493 calculates a power transmission efficiency offset by comparing the value of the current measured by the measurer 450 with the value of the current flowing in the target resonator received by the communication unit 460, and calculating the power transmission efficiency offset based on a result of the comparing. For example, when the value of the current measured by the measurer 450 is 10 A and the value of the current flowing in the target resonator is 9 A, the power transmission efficiency offset may be calculated as 1 A by the offset calculator 493.

The pulse signal generator 495 generates a pulse signal having a pulse width adjusted based on the determined charging mode of the battery and the calculated power transmission efficiency offset. The pulse signal generator 495 may adjust a pulse width, for example, by performing PWM. For example, the pulse signal generator 495 may increase a pulse width of a pulse signal in a single cycle based on the power transmission efficiency offset when the charging mode of the battery is determined to be the CC mode, thereby enabling a relatively large amount of power to be transferred by the source resonator 440 in the CC mode. As another example, the pulse signal generator 495 may decrease a pulse width of a pulse signal in a single cycle based on the power transmission efficiency offset when the charging mode of the battery is determined to be the CV mode, thereby enabling a relatively small amount of power compared to the amount of power transferred in the CC mode to be transferred by the source resonator 440 in the CV mode. In this example, the pulse signal generator 495 may flexibly adjust the pulse width based on the power transmission efficiency offset.

The pulse signal generator 495 may adjust the pulse width of the pulse signal based on a difference between a result of the comparing by the first comparator 470 and a result of the comparing by the second comparator 480. The result of the comparing by the first comparator 470 indicates an internal efficiency in a process of transmitting power through the source resonator 440 in the wireless power transmission apparatus. The result of the comparing by the second comparator 480 indicates a power transmission efficiency offset or a power transmission efficiency. The pulse signal generator 495 may adjust the pulse width of the pulse signal based on the internal efficiency and the power transmission efficiency. For example, when the internal efficiency is 90% and the power transmission efficiency is 80%, this indicates that only 72% of the power output from the AC/DC converter 420 actually reaches the target resonator. Accordingly, the pulse signal generator 495 may adjust the pulse width so that a desired amount of power may be transferred to the source resonator 440 and the target resonator.

The source resonator 440 and the target resonator may be resonators provided in a form of a coil. A number of turns of the coil of the source resonator 440 may be equal to a number of turns of the coil of the target resonator based so that a turns ratio of the number of turns of the coil of the source resonator 440 to the number of turns of the coil of the target resonator is a 1:1 ratio. In particular, the coils may be wound so that the 1:1 ratio of the number of the turns of the coil of the source resonator 240 to the number of the turns of the coil of the target resonator may be achieved.

A power transmission efficiency when the number of the turns of the coil of the source resonator 440 is equal to the number of the turns of the coil of the target resonator is higher than a power transmission efficiency when the number of the turns of the coil of the source resonator 440 is not equal to the number of the turns of the coil of the target resonator.

Figure 5:
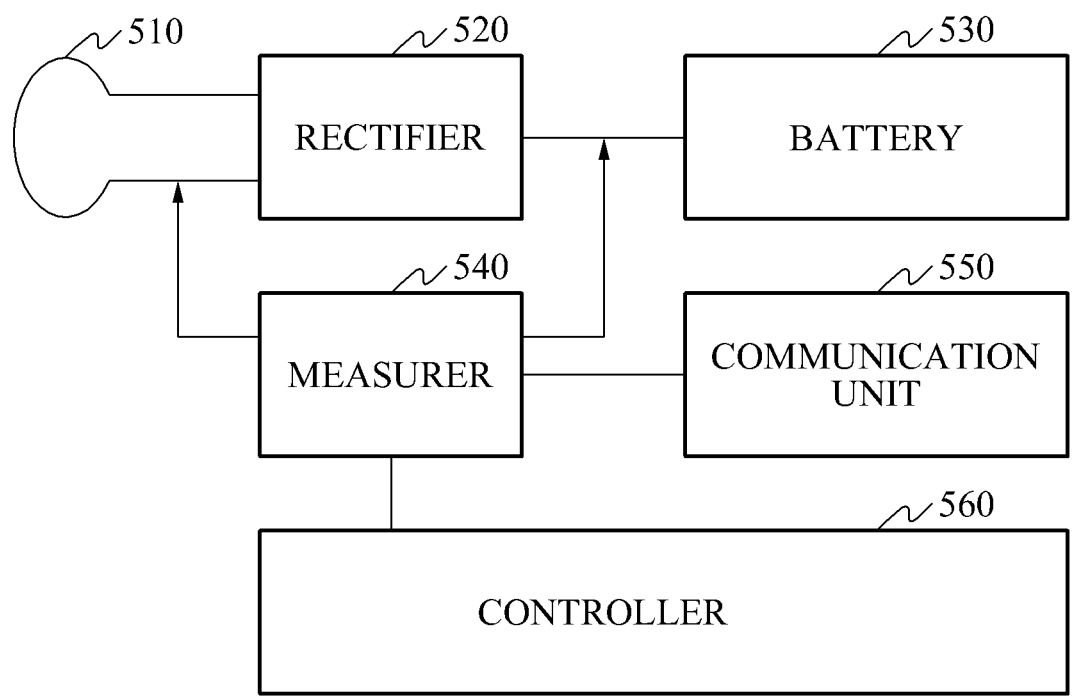
FIG. 5 is a block diagram illustrating an example of a wireless power reception apparatus.

FIG. 5 is a block diagram illustrating an example of a wireless power reception apparatus. Referring to FIG. 5, the wireless power reception apparatus includes a target resonator 510, a rectifier 520, a battery 530, a measurer 540, a communication unit 550, and a controller 560.

The target resonator 510 receives power wirelessly via a mutual resonance with a source resonator of a wireless power transmission apparatus (not shown in FIG. 5, but see the source resonator 240 in FIG. 2 and the source resonator 440 in FIG. 4). In particular, a current is induced in the target resonator 510 by the received wireless power due to the mutual resonance.

The rectifier 520 rectifies an AC power received by the source resonator 510 to a DC power.

The battery 530 stores the DC power rectified by the rectifier 520. That is, the battery 530 may be charged using the DC power.

The measurer 540 measures a value of a current flowing in the target resonator 510.

The communication unit 550 transmits the value of the current measured by the measurer 540 to the wireless power transmission apparatus. The value of the current measured by the measurer 540 may be used for calculating a power transmission efficiency or a power transmission efficiency offset by the wireless power transmission apparatus.

The measurer 540 may measure a value of a current flowing from the rectifier 520 into the battery 530, and the communication unit 550 may transmit to the wireless power transmission apparatus the value of the current flowing into the battery 530. The value of the current flowing from the rectifier 520 into the battery 530 may be used for determining a charging mode of the battery 530 by the wireless power transmission apparatus.

The communication unit 550 communicates with the wireless power transmission apparatus using either one or both of an in-band communication scheme using a resonant frequency of the target resonator 510 and an out-band communication scheme using a communication frequency differing from the resonant frequency.

The controller 560 may determine the charging mode of the battery 530 based on a change in the value of the current flowing into the battery 530. The charging mode of the battery 530 may be a CC mode in which the value of a charging current of the battery 530 is constant, and a CV mode in which the value of the charging current of the battery 530 is variable and a value of a charging voltage of the battery 530 is constant. The communication unit 550 may transmit information on the determined charging mode to the wireless power transmission apparatus.

Figure 6:
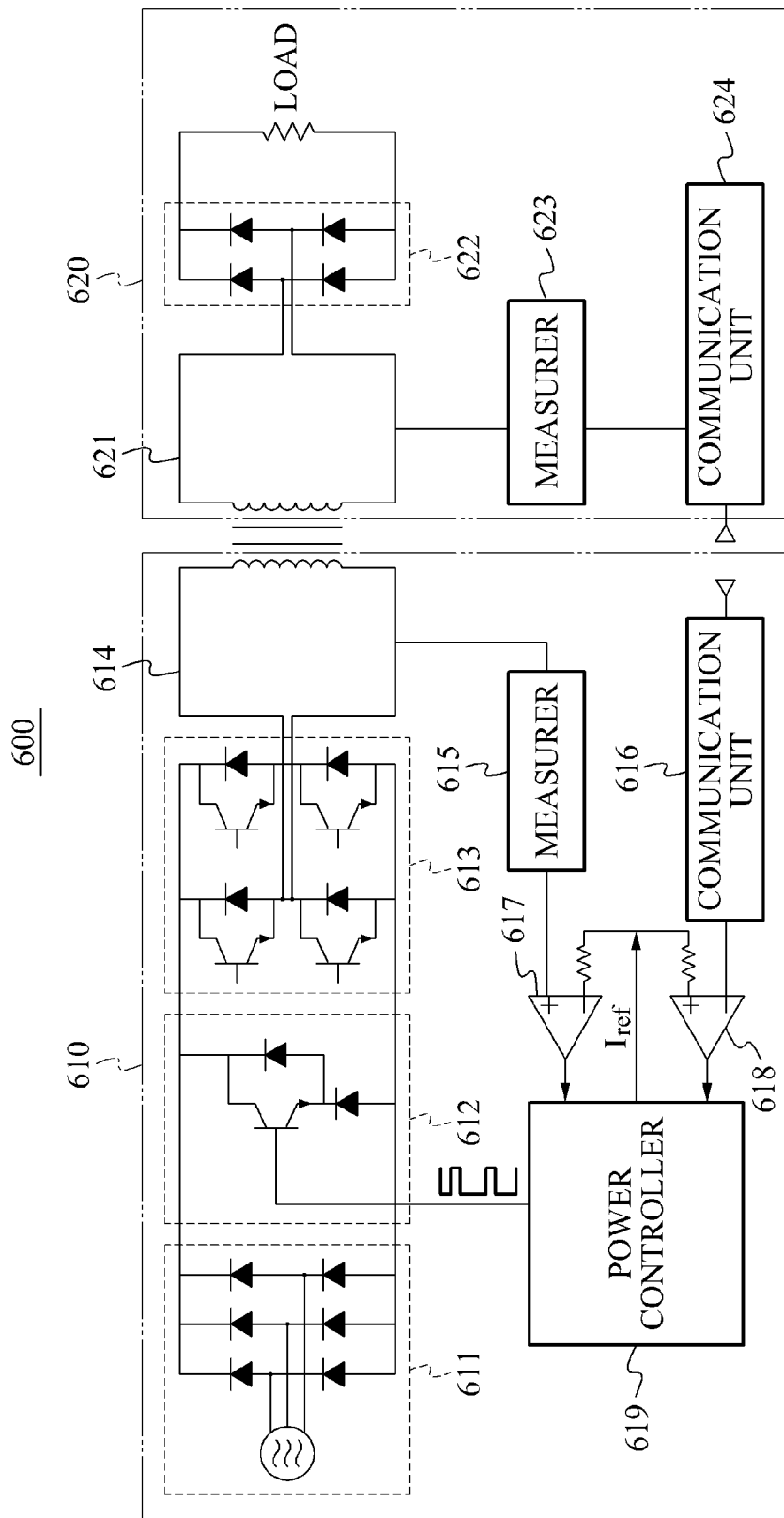
FIG. 6 is a diagram illustrating another example of a wireless power transmission system.

FIG. 6 is a block diagram illustrating another example of a wireless power transmission system 600. Referring to FIG. 6, the wireless power transmission system 600 includes a wireless power transmission apparatus 610 and a wireless power reception apparatus 620.

The wireless power transmission apparatus 610 includes a power supply unit 611, an AC/DC converter 612, a DC/AC converter 613, a source resonator 614, a measurer 615, a communication unit 616, a first comparator 617, a second comparator 618, and a power controller 619.

The power supply unit 611 provides a three-phase AC power. The AC/DC converter 612 converts the AC power supplied by the power supply unit 611 to a DC power. The AC/DC converter 612 receives a pulse signal having a modulated pulse width from the power controller 619, and converts the AC power to the DC power based on the pulse width of the received signal. An amplitude of the DC power may increase or decrease based on the pulse width.

The DC/AC converter 613 converts the DC power to an AC power in a resonant frequency band of the source resonator 614. The DC/AC converter 613 may be implemented as an inverter. The source resonator 614 transfers the AC power to a target resonator 621 via a mutual resonance with the target resonator 621.

The measurer 615 measures a value of a current flowing in the source resonator 614. The communication unit 616 receives from a communication unit 624 information on a value of a current flowing in the target resonator 621 measured by a measurer 623.

The first comparator 617 compares the value of the current measured by the measurer 615 with a reference current value $I_{ref}$. The reference current value $I_{ref}$ may be set to a value of a current corresponding to an amount of power to be transmitted by the power controller 619 via the source resonator 614. The first comparator 617 may transfer to the power controller 619 a difference between the value of the current measured by the measurer 615 and the reference current value $I_{ref}$. The first comparator 617 may also transfer to the power controller 619 information indicating which one of the value of the current measured by the measurer 615 and the reference current value $I_{ref}$ has a greater value. For example, the first comparator 617 may output a bit "1" when the current measured by the measurer 615 is has a greater value than the reference current value $I_{ref}$, and output a bit "0" when the reference current value $I_{ref}$ has greater value than the current measured by the measurer 615.

The second comparator 618 compares the value of the current flowing in the target resonator 621 received by the communication unit 616 with the reference current value $I_{ref}$. The second comparator 618 transfers to the power controller 619 a difference between the value of the current flowing in the target resonator 621 received by the communication unit 616 and the reference current value $I_{ref}$. The second comparator 618 may also transfer to the power controller 619 information indicating which one of the value of the current flowing in the target resonator 621 received by the communication unit 616 and the reference current value $I_{ref}$ has a greater value. For example, the second comparator 618 may output a bit "1" when the current flowing in the target resonator 621 received by the communication unit 616 has a greater value than the reference current value $I_{ref}$, and output a bit "0" when the reference current value $I_{ref}$ has a greater value than the current flowing in the target resonator 621 received by the communication unit 616.

The power controller 619 may adjust a pulse width of a pulse signal based on a difference between a result of the comparing by the first comparator 617 and a result of the comparing by the second comparator 618. The result of the comparing by the first comparator 617 indicates an internal efficiency in a process of transmitting power via the source resonator 614 in the wireless power transmission apparatus 610. The result of the comparing by the second comparator 618 indicates a power transmission efficiency offset or a power transmission efficiency. The power controller 619 may adjust the pulse width of the pulse signal based on the internal efficiency and the power transmission efficiency. For example, when the internal efficiency is 90% and the power transmission efficiency is 80%, this indicates that only 72% of the power output from the AC/DC converter 612 actually reaches the target resonator. Accordingly, the power controller 619 may adjust the pulse width so that a desired amount of power may be transferred to the source resonator 614 and the target resonator 621.

The wireless power reception apparatus 620 includes the target resonator 621, a rectifier 622, the measurer 623, the communication unit 624, and a load.

The target resonator 621 receives power wirelessly via a mutual resonance with the source resonator 614 of the wireless power transmission apparatus 610. In particular, a current may be induced in the target resonator 621 by the received wireless power due to the mutual resonance. The rectifier 622 rectifies an AC power received by the target resonator 621 to a DC power. The load may be a battery. The load may store the DC power rectified by the rectifier 622. The measurer 623 measures a value of a current flowing in the target resonator 621. The communication unit 624 transmits the value of the current measured by the measurer 623 to the communication unit 616. The value of the current measured by the measurer 623 may be used for calculating a power transmission efficiency or a power transmission efficiency offset.

Figure 7:
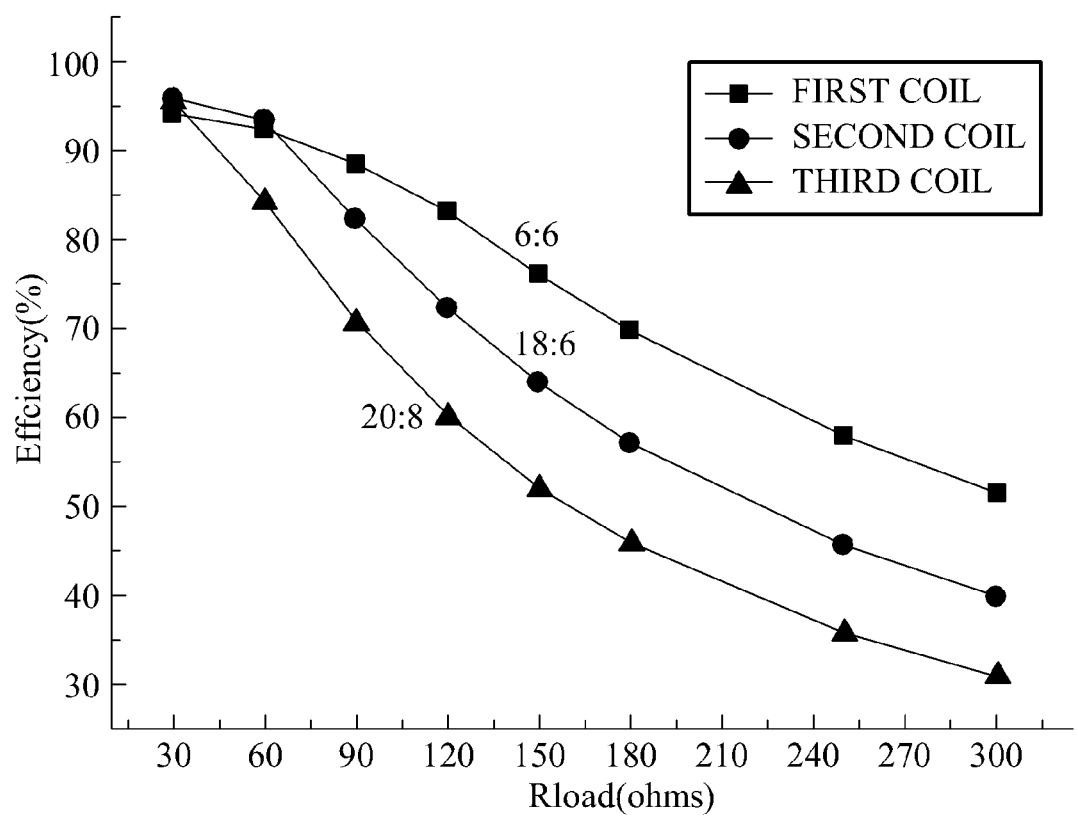
FIG. 7 is a graph illustrating an example of wireless power transmission efficiencies depending on a turns ratio of a coil of a target resonator and a coil of a source resonator in a wireless power transmission system.

FIG. 7 is a graph illustrating an example of wireless power transmission efficiencies depending on a turns ratio of a coil of a target resonator and a coil of a source resonator in a wireless power transmission system. Referring to FIG. 7, three cases in which the turns ratio is 6:6, 18:6, and 20:8 are illustrated.

As can seen from FIG. 7, a power transmission efficiency is highest when the turns ratio is 6:6, which be simplified to 1:1. In particular, as the number of the turns of the coil of the source resonator becomes closer to the number of the turns of the coil of the target resonator, the power transmission efficiency increases. In view of such a characteristic, a source resonator and a target resonator may be designed and implemented so that the turns ratio of their coils is 1:1.

Figure 8:
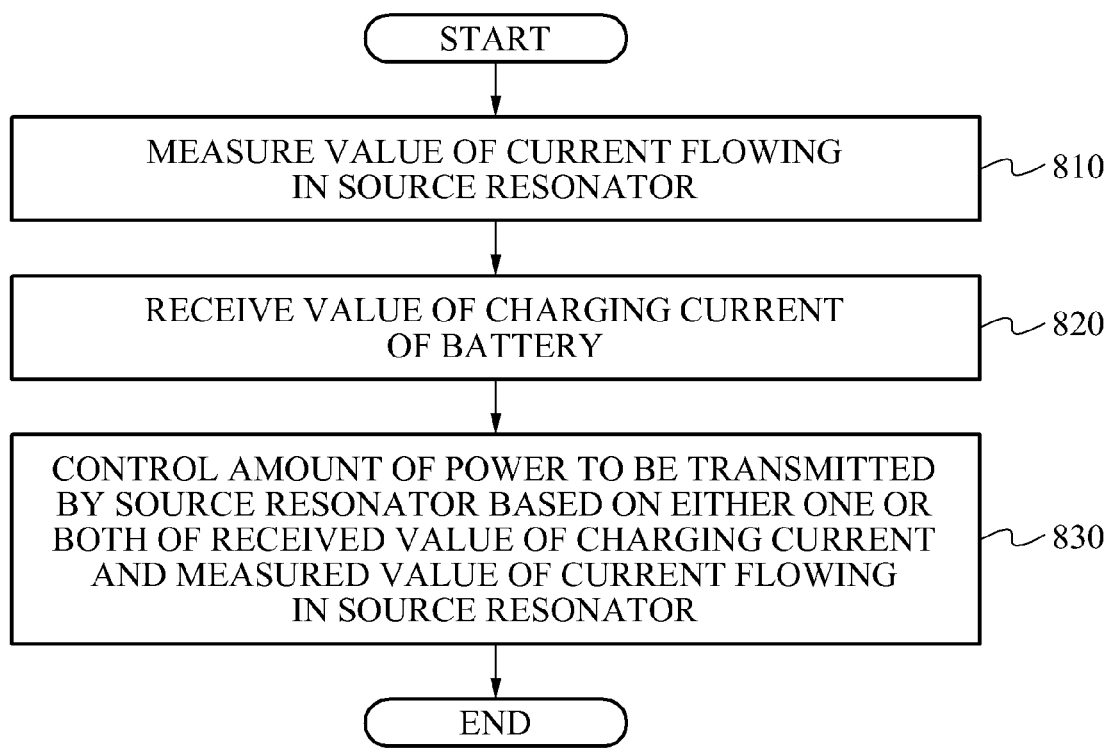
FIG. 8 is a flowchart illustrating an example of a wireless power transmission method.

FIG. 8 is a flowchart illustrating an example of a wireless power transmission method. Referring to FIG. 8, in 810, a wireless power transmission apparatus measures a value of a current flowing in a source resonator.

In 820, the wireless power transmission apparatus receives a value of a charging current of a battery from a wireless power reception apparatus. In this example, the value of the charging current of the battery varies as the battery of the wireless power reception apparatus is charged.

In 830, the wireless power transmission apparatus controls an amount of power to be transmitted by the source resonator based on either one or both of the received value of the charging current and the measured value of the current flowing in the source resonator.

The wireless power transmission apparatus may determine a charging mode of the battery based on a change in the received value of the charging current, and generate a pulse signal having a pulse width adjusted based on the determined charging mode of the battery. The charging mode of the battery may be a CC mode in which the value of the charging current of the battery is constant, or a CV mode in which the value of the charging current of the battery is variable and a value of a charging voltage of the battery is constant.

The wireless power transmission apparatus may convert an AC power supplied from a power supply to a DC power based on the adjusted pulse width of the pulse signal, and convert the DC power to an AC power based on a resonant frequency of the source resonator.

The wireless power transmission apparatus may receive, from the wireless power reception apparatus, a value of a current flowing in a target resonator of the wireless power reception apparatus, calculate a power transmission efficiency offset by comparing the measured value of the current with the received value of the current flowing in the target resonator and calculating the power transmission efficiency offset based on a result of the comparing, and generate a pulse signal having a pulse width adjusted based on the calculated power transmission efficiency offset.

FIG. 9 is a flowchart illustrating another example of a wireless power transmission method. Referring to FIG. 9, in 910, a wireless power transmission apparatus determines a charging mode of a battery based on a change in a received value of a charging current of the battery. The charging mode of the battery may be a CC mode in which the value of the charging current of the battery is constant, or a CV mode in which the value of the charging current of the battery is variable and a value of a charging voltage of the battery is constant.

In 920, the wireless power transmission apparatus calculates a power transmission efficiency offset by comparing a measured value of a current with a received value of a current flowing in a target resonator, and calculating the power transmission efficiency based on a result of the comparing.

In 930, the wireless power transmission apparatus generates a pulse signal having a pulse width adjusted based on the calculated power transmission efficiency offset.

The wireless power transmission apparatus may control a power to be transmitted based on an internal efficiency and a power transmission efficiency, thereby transmitting an amount of power to be used by the wireless power reception apparatus more precisely.

The wireless power transmission apparatus may control a power to be transmitted based on a charging mode of a battery, thereby transmitting an amount of power to be used for charging the battery efficiently.

The wireless power reception apparatus may transmit to the wireless power transmission apparatus information on a value of a current to be used to charge a battery or a value of a current flowing in a target resonator, thereby providing information to be used for calculating a power transmission efficiency or a power transmission efficiency offset. The wireless power transmission apparatus may calculate the power transmission efficiency or the power transmission efficiency offset based on the information on the value of the current to be used to charge the battery or the value of the current flowing in the target resonator.

FIGS. 10A, 10B, 11A, 11B, 12A, and 12B are diagrams illustrating examples of applications using a wireless power transmission apparatus.

Figure 10A:
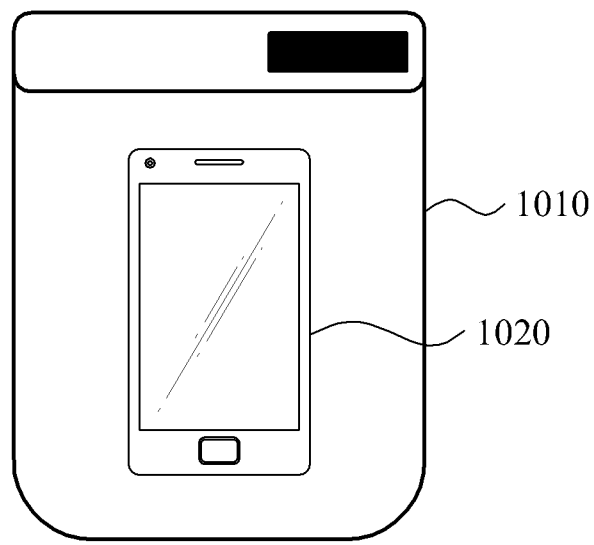
FIGS. 10A, 10B, 11A, 11B, 12A, and 12B are diagrams illustrating examples of applications using a wireless power transmission apparatus.
Figure 10B:
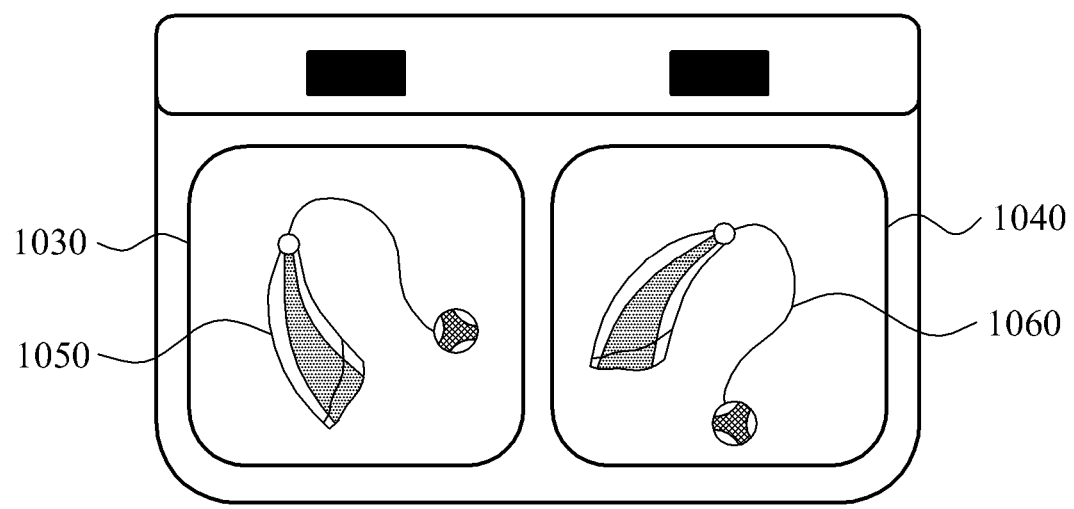

FIG. 10A is a diagram illustrating an example of wireless power charging between a pad 1010 and a mobile terminal 1020, and FIG. 10B is a diagram illustrating an example of wireless power charging between pads 1030 and 1040 and hearing aids 1050 and 1060.

In the example in FIG. 10A, a wireless power transmitter is mounted in the pad 1010, and a wireless power receiver is mounted in the mobile terminal 1020. The pad 1010 may be used to charge a single mobile terminal, namely the mobile terminal 1020.

In the example in FIG. 10B, two wireless power transmitters are respectively mounted in the pads 1030 and 1040. The hearing aids 1050 and 1060 may be used for a left ear and a right ear, respectively. In this example, two wireless power receivers are respectively mounted in the hearing aids 1050 and 1060.

Figure 11A:
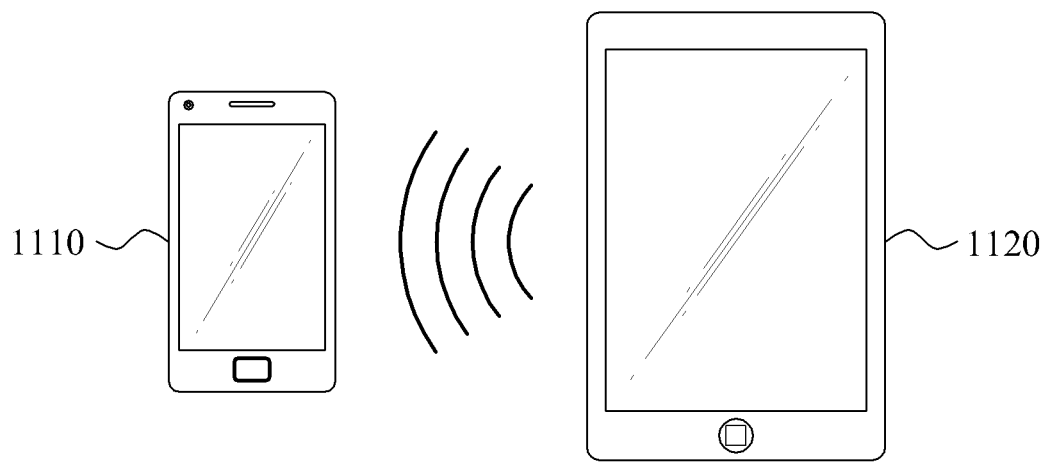
Figure 11B:
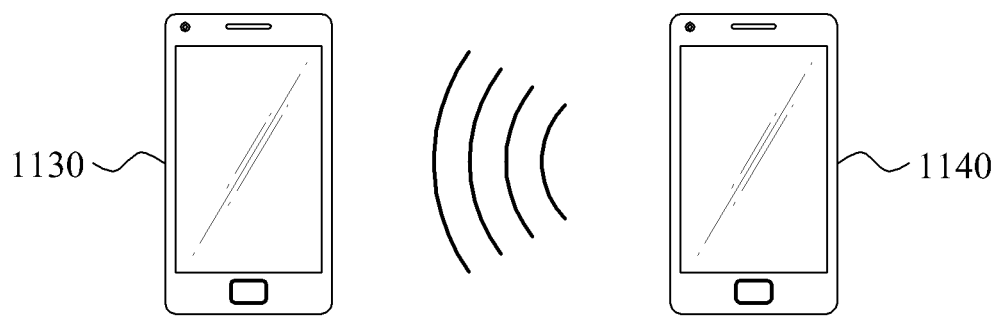

FIG. 11A is a diagram illustrating an example of wireless power charging between a mobile terminal 1110 and a tablet PC 1120, and FIG. 11B is a diagram illustrating an example of wireless power charging between mobile terminals 1130 and 1140.

In the example in FIG. 11A, a wireless power transmitter and a wireless power receiver are mounted in the mobile terminal 1110, and a wireless power transmitter and a wireless power receiver are mounted in the tablet PC 1120. The mobile terminal 1110 and the tablet PC 1120 may wirelessly exchange power.

In example in FIG. 11B, a wireless power transmitter and a wireless power receiver are mounted in the mobile terminal 1130, and a wireless power transmitter and a wireless power receiver are mounted in the mobile terminal 1140. The mobile terminals 1130 and 1140 may wirelessly exchange power.

Figure 12A:
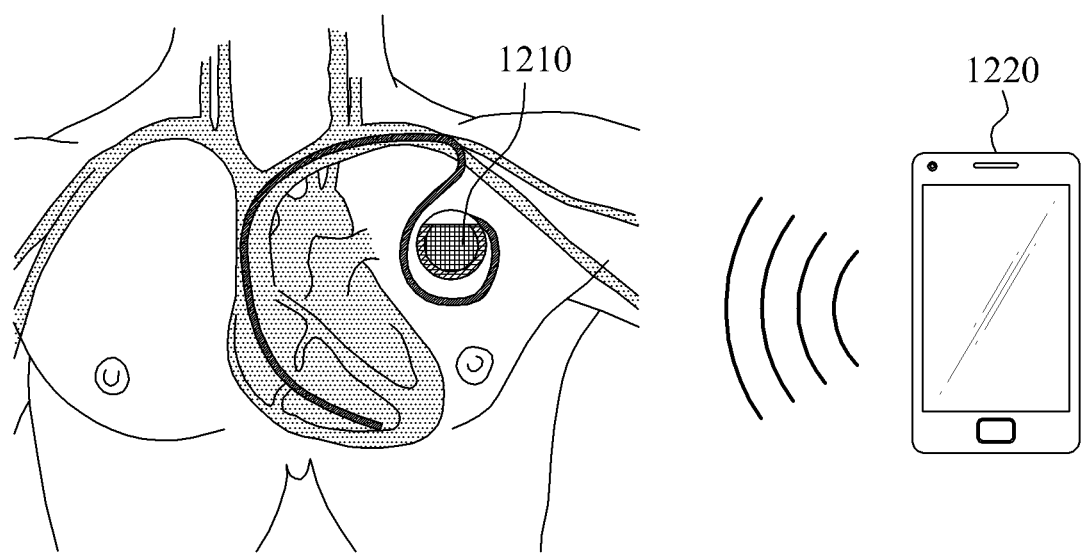
Figure 12B:
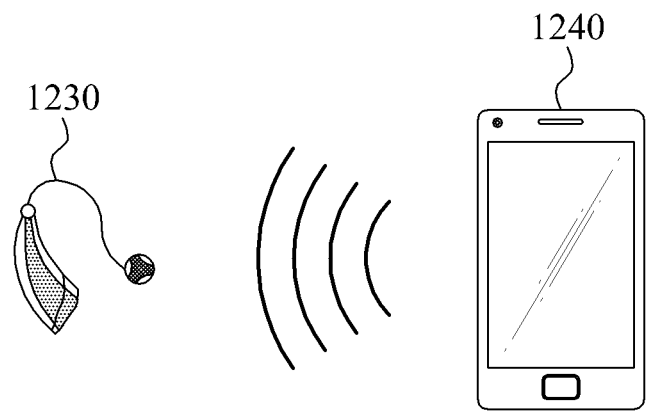

FIG. 12A is a diagram illustrating an example of wireless power charging between an electronic device 1210 that is inserted into a human body, and a mobile terminal 1220. FIG. 12B is a diagram illustrating an example of wireless power charging between a hearing aid 1230 and a mobile terminal 1240.

In the example in FIG. 12A, a wireless power transmitter and a wireless power receiver are mounted in the mobile terminal 1220, and a wireless power receiver is mounted in the electronic device 1210. The electronic device 1210 may be charged by receiving power from the mobile terminal 1220.

In the example in FIG. 12B, a wireless power transmitter and a wireless power receiver are mounted in the mobile terminal 11230, and a wireless power receiver is mounted in the hearing aid 1230. The hearing aid 1230 may be charged by receiving power from the mobile terminal 1240. Low-power electronic devices, such as Bluetooth earphones, may also be charged by receiving power from the mobile terminal 1240.

In the following description of FIGS. 13A through 15B, unless otherwise indicated, the term "resonator" may refer to both a source resonator and a target resonator. The resonators of FIGS. 13A through 15B may be used as the resonators of FIGS. 1 through 12B.

Figure 13A:
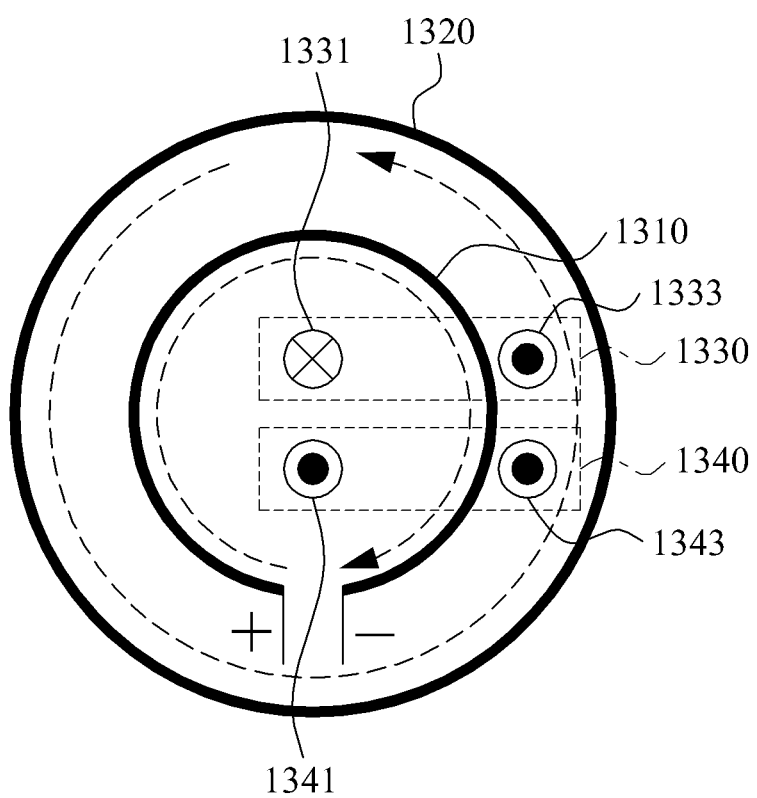
FIGS. 13A and 13B are diagrams illustrating examples of a distribution of a magnetic field in a feeder and a resonator of a wireless power transmitter.
Figure 13B:
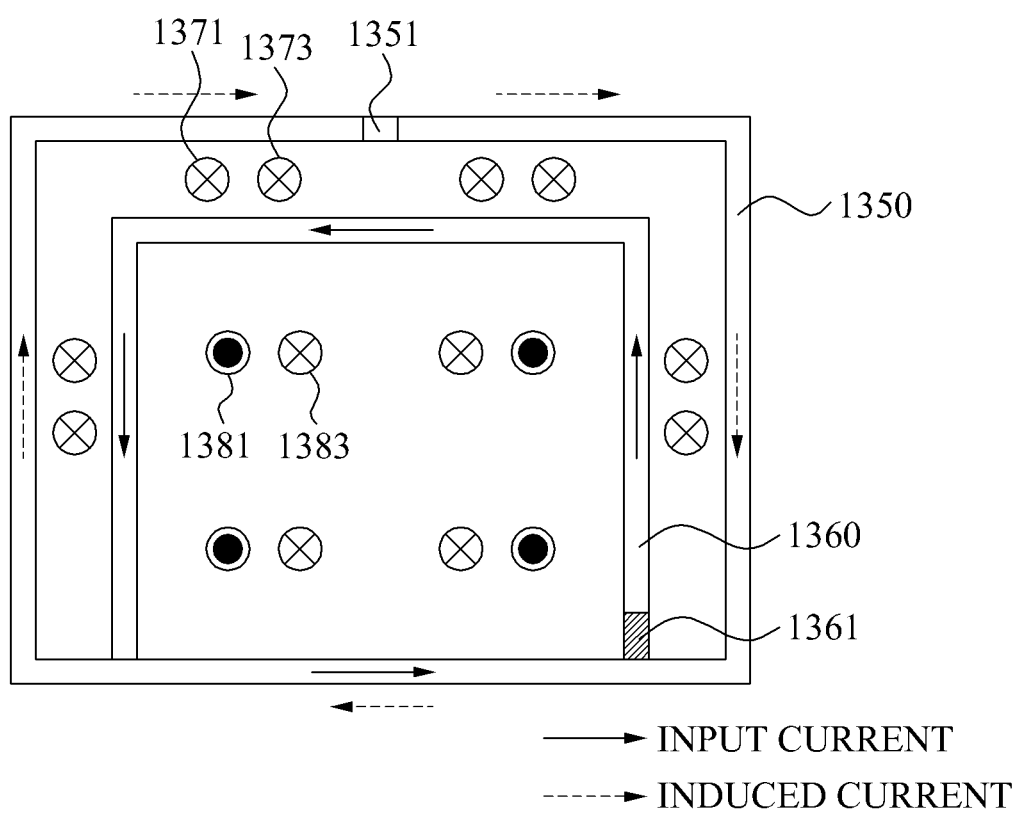

FIGS. 13A and 13B are diagrams illustrating examples of a distribution of a magnetic field in a feeder and a resonator of a wireless power transmitter. When a resonator receives power supplied through a separate feeder, magnetic fields are formed in both the feeder and the resonator.

FIG. 13A is a diagram illustrating an example of a structure of a wireless power transmitter in which a feeder 1310 and a resonator 1320 do not have a common ground. Referring to FIG. 13A, as an input current flows into the feeder 1310 through terminal labeled "+" and out of the feeder 1310 through a terminal labeled "−", a magnetic field 1330 is formed by the input current. A direction 1331 of the magnetic field 1330 inside the feeder 1310 is into the plane of FIG. 13A, and is opposite to a direction 1333 of the magnetic field 1330 outside the feeder 1310, which is out of the plane of FIG. 13A. The magnetic field 1330 formed by the feeder 1310 induces a current to flow in the resonator 1320. The direction of the induced current in the resonator 1320 is opposite to a direction of the input current in the feeder 1310, as indicated by the dashed lines with arrowheads in FIG. 13A.

The induced current in the resonator 1320 forms a magnetic field 1340. A direction of the magnetic field generated by the induced current is the same at all positions inside the resonator 1320, and is out of the plane of FIG. 13A. Accordingly, a direction 1341 of the magnetic field 1340 formed by the resonator 1320 inside the feeder 1310 is the same as a direction 1343 of the magnetic field 1340 formed by the resonator 1320 outside the feeder 1310.

Consequently, when the magnetic field 1330 formed by the feeder 1310 and the magnetic field 1340 formed by the resonator 1320 are combined, the strength of the total magnetic field inside the resonator 1320 decreases inside the feeder 1310, but increases outside the feeder 1310. In an example in which power is supplied to the resonator 1320 through the feeder 1310 configured as illustrated in FIG. 13A, the strength of the total magnetic field decreases in the center of the resonator 1320, but increases outside the resonator 1320. In another example in which a magnetic field is randomly or not uniformly distributed in the resonator 1320, it is difficult to perform impedance matching since an input impedance will frequently vary. Additionally, when the strength of the total magnetic field increases, an efficiency of wireless power transmission increases. Conversely, when the strength of the total magnetic field decreases, the efficiency of wireless power transmission decreases. Accordingly, the power transmission efficiency is reduced on average when the magnetic field is randomly or not uniformly distributed in the resonator 1320 compared to when the magnetic field is uniformly distributed in the resonator 1320.

FIG. 13B is a diagram illustrating an example of a structure of a wireless power transmission apparatus in which a resonator 1350 and a feeder 1360 have a common ground. The resonator 1350 includes a capacitor 1351. The feeder 1360 receives a radio-frequency (RF) signal via a port 1361. When the RF signal is input to the feeder 1360, an input current is generated in the feeder 1360 as indicated by the solid lines with arrowheads in FIG. 13B. The input current flowing in the feeder 1360 forms a magnetic field, and a current is induced in the resonator 1350 by the magnetic field as indicated by the dashed lines with arrowheads in FIG. 13B. Additionally, another magnetic field is generated by the induced current flowing in the resonator 1350. In this example, a direction of the input current flowing in the feeder 1360 is opposite to a direction of the induced current flowing in the resonator 1350. Accordingly, in a region between the resonator 1350 and the feeder 1360, a direction 1371 of the magnetic field generated by the input current is the same as a direction 1373 of the magnetic field generated by the induced current, and thus the strength of the total magnetic field increases in the region between the resonator 1350 and the feeder 1360. Conversely, inside the feeder 1360, a direction 1381 of the magnetic field generated by the input current is opposite to a direction 1383 of the magnetic field generated by the induced current, and thus the strength of the total magnetic field decreases inside the feeder 1360. Therefore, the strength of the total magnetic field decreases in the center of the resonator 1350, but increases near an outer periphery of the resonator 1350. Thus, a magnetic field may be more uniformly distributed in the resonator 1550 in FIG. 13B, compared to the structure of FIG. 13A.

An input impedance may be adjusted by adjusting an internal area of the feeder 1360. The input impedance is an impedance viewed in a direction from the feeder 1360 to the resonator 1350. When the internal area of the feeder 1360 increases, the input impedance increases. Conversely, when the internal area of the feeder 1360 decreases, the input impedance decreases. Because the magnetic field is randomly distributed in the resonator 1350 despite a reduction in the input impedance, the input impedance may vary based on a location of a target. Accordingly, a separate matching network may be required to match the input impedance to an output impedance of a power amplifier. For example, when the input impedance increases, a separate matching network may be used to match the increased input impedance to a relatively low output impedance of the power amplifier.

Figure 14A:
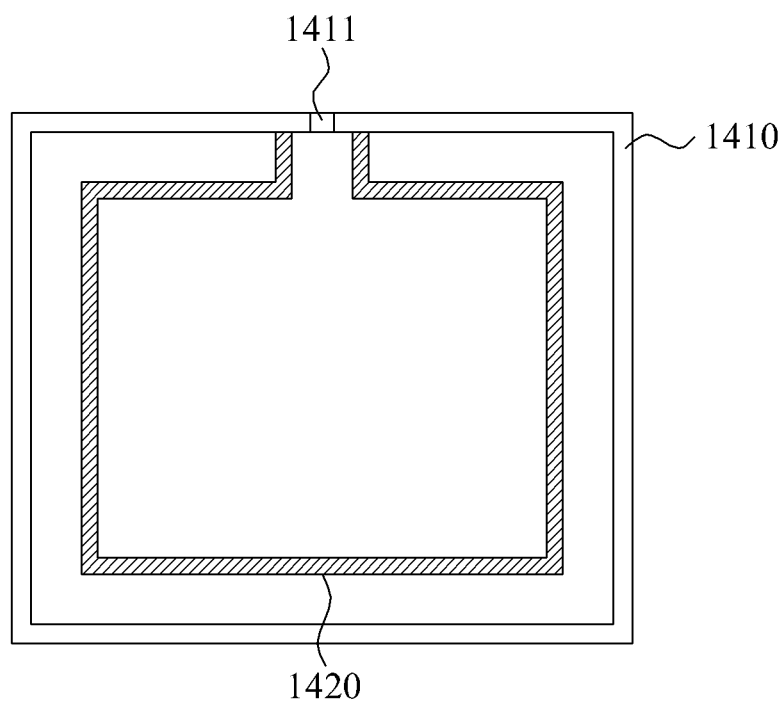
FIGS. 14A and 14B are diagrams illustrating an example of a wireless power transmitter including a feeder and a resonator.
Figure 14B:
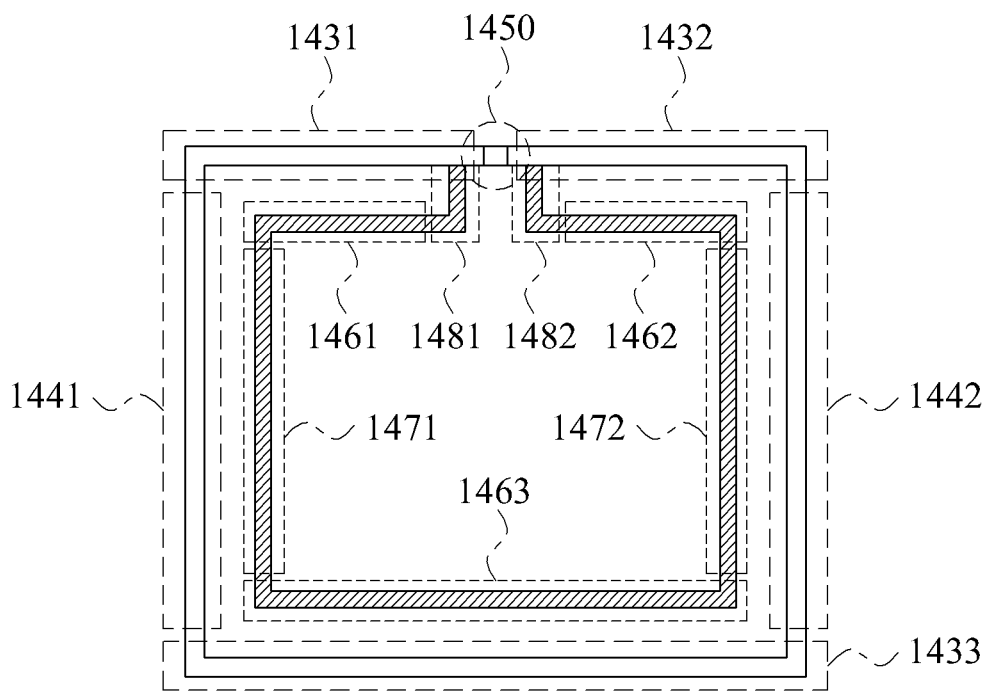

FIGS. 14A and 14B are diagrams illustrating an example of a wireless power transmission apparatus including a resonator and a feeder. Referring to FIG. 14A, the wireless power transmission apparatus includes a resonator 1410 and a feeder 1420. The resonator 1410 includes include a capacitor 1411. The feeder 1420 is electrically connected to both ends of the capacitor 1411.

FIG. 14B is a diagram illustrating in greater detail a structure of the wireless power transmission apparatus of FIG. 14A. The resonator 1410 includes a first transmission line (not identified by a reference numeral in FIG. 14B, but formed by various elements in FIG. 14B as discussed below), a first conductor 1441, a second conductor 1442, and at least one capacitor 1450.

The capacitor 1450 is inserted in series between a first signal conducting portion 1431 and a second signal conducting portion 1432, causing an electric field to be concentrated in the capacitor 1450. Generally, a transmission line includes at least one conductor in an upper portion of the transmission line, and at least one conductor in a lower portion of the transmission line. A current may flow through the at least one conductor disposed in the upper portion of the transmission line, and the at least one conductor disposed in the lower portion of the transmission line may be electrically grounded. In this example, a conductor disposed in an upper portion of the first transmission line in FIG. 14B is separated into two portions that will be referred to as the first signal conducting portion 1431 and the second signal conducting portion 1432. A conductor disposed in a lower portion of the first transmission line in FIG. 14B will be referred to as a first ground conducting portion 1433.

As illustrated in FIG. 14B, the resonator 1410 has a generally two-dimensional (2D) structure. The first transmission line includes the first signal conducting portion 1431 and the second signal conducting portion 1432 in the upper portion of the first transmission line, and includes the first ground conducting portion 1433 in the lower portion of the first transmission line. The first signal conducting portion 1431 and the second signal conducting portion 1432 are disposed to face the first ground conducting portion 1433. A current flows through the first signal conducting portion 1431 and the second signal conducting portion 1432.

One end of the first signal conducting portion 1431 is connected to one end of the first conductor 1441, the other end of the first signal conducting portion 1431 is connected to one end of the capacitor 1450, and the other end of the first conductor 1441 is connected to one end of the first ground conducting portion 1433. One end of the second signal conducting portion 1432 is connected to one end of the second conductor 1442, the other end of the second signal conducting portion 1432 is connected to the other end of the capacitor 1450, and the other end of the second conductor 1442 is connected to the other end of the first ground conducting portion 1433. Accordingly, the first signal conducting portion 1431, the second signal conducting portion 1432, the first ground conducting portion 1433, the first conductor 1441, and the second conductor 1442 are connected to each other, causing the resonator 1410 to have an electrically closed loop structure. The term "loop structure" includes a polygonal structure, a circular structure, a rectangular structure, and any other geometrical structure that is closed, i.e., that does not have any opening in its perimeter. The phrase "having a loop structure" indicates a structure that is electrically closed.

The capacitor 1450 is inserted into an intermediate portion of the first transmission line. In the example in FIG. 14B, the capacitor 1450 is inserted into a space between the first signal conducting portion 1431 and the second signal conducting portion 1432. The capacitor 1450 may be a lumped element capacitor, a distributed element capacitor, or any other type of capacitor known to one of ordinary skill in the art. For example, a distributed element capacitor may include zigzagged conductor lines and a dielectric material having a relatively high permittivity disposed between the zigzagged conductor lines.

The capacitor 1450 inserted into the first transmission line may cause the resonator 1410 to have a characteristic of a metamaterial. A metamaterial is a material having a predetermined electrical property that is not found in nature, and thus may have an artificially designed structure. All materials existing in nature have a magnetic permeability and a permittivity. Most materials have a positive magnetic permeability and/or a positive permittivity.

For most materials, a right-hand rule may be applied to an electric field, a magnetic field, and a Poynting vector of the materials, so the materials may be referred to as right-handed materials (RHMs). However, a metamaterial having a magnetic permeability and/or a permittivity that is not found in nature may be classified into an epsilon negative (ENG) material, a mu negative (MNG) material, a double negative (DNG) material, a negative refractive index (NRI) material, a left-handed (LH) material, and any other metamaterial classification known to one of ordinary skill in the art based on a sign of the magnetic permeability of the metamaterial and a sign of the permittivity of the metamaterial.

If the capacitor 1450 is a lumped element capacitor and a capacitance of the capacitor 1450 is appropriately determined, the resonator 1410 may have a characteristic of the metamaterial. If the resonator 1410 is caused to have a negative magnetic permeability by appropriately adjusting the capacitance of the capacitor 1450, the resonator 1410 may also be referred to as an MNG resonator. Various criteria may be applied to determine the capacitance of the capacitor 1450. For example, the various criteria may include a criterion for enabling the resonator 1410 to have the characteristic of the metamaterial, a criterion for enabling the resonator 1410 to have a negative magnetic permeability at a target frequency, a criterion for enabling the resonator 1410 to have a zeroth order resonance characteristic at the target frequency, and any other suitable criterion. Based on any one or any combination of the aforementioned criteria, the capacitance of the capacitor 1450 may be determined.

The resonator 1410, hereinafter referred to as the MNG resonator 1410, may have a zeroth order resonance characteristic of having a resonant frequency when a propagation constant is "0". If the resonator 1410 has the zeroth order resonance characteristic, the resonant frequency is independent of a physical size of the MNG resonator 1410. By appropriately changing the capacitance of the capacitor 1450, the resonant frequency of the MNG resonator 1410 may be changed without changing the physical size of the MNG resonator 1410.

In a near field, the electric field is concentrated on the capacitor 1450 inserted into the first transmission line, causing the magnetic field to become dominant in the near field. The MNG resonator 1410 has a relatively high Q-factor when the capacitor 1450 is a lumped element capacitor, and thereby increasing a power transmission efficiency. The Q-factor indicates a level of an ohmic loss or a ratio of a reactance with respect to a resistance in the wireless power transmission. As will be understood by one of ordinary skill in the art, the efficiency of the wireless power transmission will increase as the Q-factor increases.

Although not illustrated in FIG. 14B, a magnetic core passing through the MNG resonator 1410 may be provided to increase a power transmission distance.

Referring to FIG. 14B, the feeder 1420 may include a second transmission line (not identified by a reference numeral in FIG. 14B, but formed by various elements in FIG. 14B as discussed below), a third conductor 1471, a fourth conductor 1472, a fifth conductor 1481, and a sixth conductor 1482.

The second transmission line includes a third signal conducting portion 1461 and a fourth signal conducting portion 1462 in an upper portion of the second transmission line, and includes a second ground conducting portion 1463 in a lower portion of the second transmission line. The third signal conducting portion 1461 and the fourth signal conducting portion 1462 are disposed to face the second ground conducting portion 1463. A current flows through the third signal conducting portion 1461 and the fourth signal conducting portion 1462.

One end of the third signal conducting portion 1461 is connected to one end of the third conductor 1471, the other end of the third signal conducting portion 1461 is connected to one end of the fifth conductor 1481, and the other end of the third conductor 1471 is connected to one end of the second ground conducting portion 1463. One end of the fourth signal conducting portion 1462 is connected to one end of the fourth conductor 1472, the other end of the fourth signal conducting portion 1462 is connected to one end of the sixth conductor 1482, and the other end of the fourth conductor 1472 is connected to the other end of the second ground conducting portion 1463. The other end of the fifth conductor 1481 is connected to the first signal conducting portion 1431 at or near where the first signal conducting portion 1431 is connected to one end of the capacitor 1450, and the other end of the sixth conductor 1482 is connected to the second signal conducting portion 1432 at or near where the second signal conducting portion 1432 is connected to the other end of the capacitor 1450. Thus, the fifth conductor 1481 and the sixth conductor 1482 are connected in parallel with both ends of the capacitor 1450. The fifth conductor 1481 and the sixth conductor 1482 may be used as an input port to receive an RF signal as an input.

Accordingly, the third signal conducting portion 1461, the fourth signal conducting portion 1462, the second ground conducting portion 1463, the third conductor 1471, the fourth conductor 1472, the fifth conductor 1481, the sixth conductor 1482, and the resonator 1410 are connected to each other, causing the resonator 1410 and the feeder 1420 to have an electrically closed loop structure. The term "loop structure" includes a polygonal structure, a circular structure, a rectangular structure, and any other geometrical structure that is closed, i.e., that does not have any opening in its perimeter. The phrase "having a loop structure" indicates a structure that is electrically closed.

If an RF signal is input to the fifth conductor 1481 or the sixth conductor 1482, an input current flows through the feeder 1420 and the resonator 1410, generating a magnetic field that induces a current in the resonator 1410. A direction of the input current flowing through the feeder 1420 is the same as a direction of the induced current flowing through the resonator 1410, thereby causing the strength of the total magnetic field to increase in the center of the resonator 1410, and decrease near the outer periphery of the resonator 1410.

An input impedance is determined based by an area of a region between the resonator 1410 and the feeder 1420. Accordingly, a separate matching network used to match the input impedance to an output impedance of a power amplifier may not be necessary. However, even if a matching network is used, the input impedance may be adjusted by adjusting a size of the feeder 1420, and accordingly a structure of the matching network may be simplified. The simplified structure of the matching network reduces a matching loss of the matching network.

The second transmission line, the third conductor 1471, the fourth conductor 1472, the fifth conductor 1481, and the sixth conductor 1482 of the feeder 1420 may have the same structure as the resonator 1410. For example, if the resonator 1410 has a loop structure, the feeder 1420 may also have a loop structure. As another example if the resonator 1410 has a circular structure, the feeder 1420 may also have a circular structure.

Figure 15A:
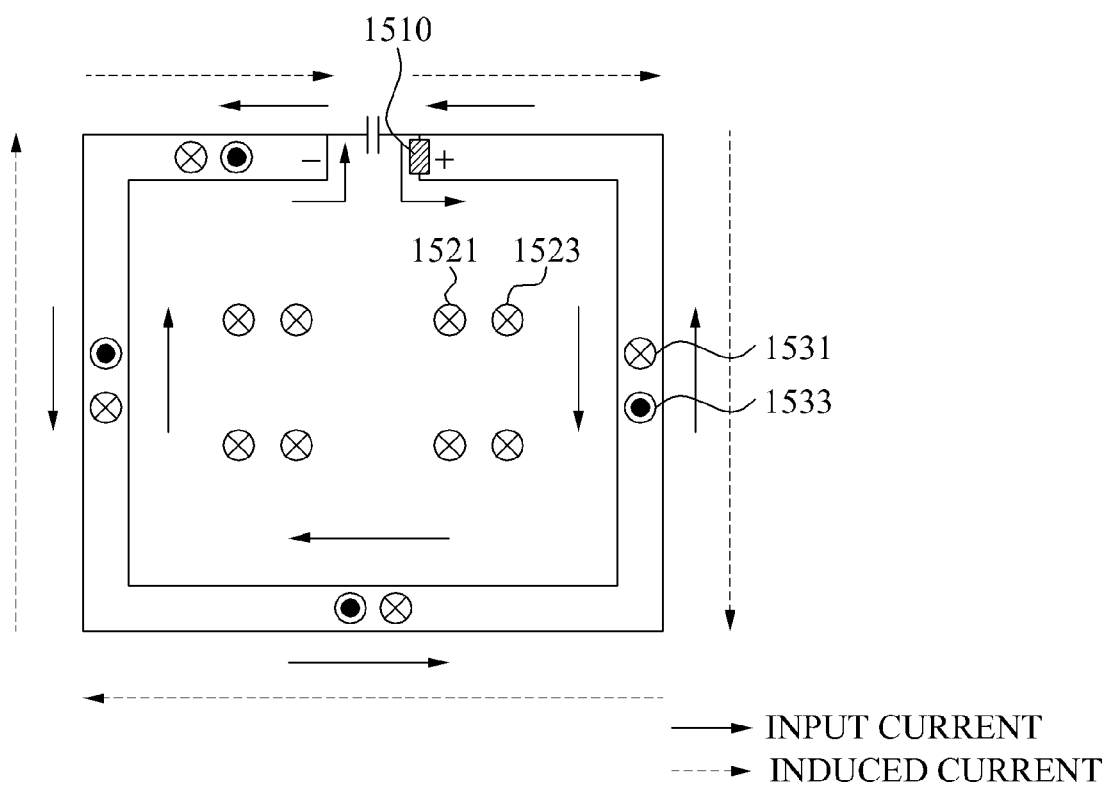
FIG. 15A is a diagram illustrating an example of a distribution of a magnetic field inside a resonator produced by feeding of a feeder.

FIG. 15A is a diagram illustrating an example of a distribution of a magnetic field inside a resonator produced by feeding of a feeder. FIG. 15A more simply illustrates the resonator 1410 and the feeder 1420 of FIGS. 14A and 14B, and the following description of FIG. 15A refers to elements that are shown in FIGS. 14A and 14B.

A feeding operation may be an operation of supplying power to a source resonator in wireless power transmission, or an operation of supplying AC power to a rectifier in wireless power transmission. FIG. 15A illustrates a direction of an input current flowing in the feeder as indicated by the solid lines with arrowheads, and a direction of an induced current flowing in the source resonator as indicated by the dashed lines with arrowheads. Additionally, FIG. 15A illustrates a direction of a magnetic field generated by the input current of the feeder, and a direction of a magnetic field generated by the induced current of the source resonator.

Referring to FIG. 15A, the fifth conductor 1481 or the sixth conductor 1482 of the feeder 1420 of FIG. 14A may be used as an input port 1510. In the example in FIG. 15A, the sixth conductor 1482 of the feeder 1420 is being used as the input 1510. An RF signal is input to the input port 1510. The RF signal may be output from a power amplifier. The power amplifier may increase and decrease an amplitude of the RF signal based on a power requirement of a target. The RF signal input to the input port 1510 is represented in FIG. 15A as an input current flowing in the feeder 1420. The input current flows in a clockwise direction in the feeder 1420 along the second transmission line of the feeder 1420. The fifth conductor 1481 and the sixth conductor 1482 of the feeder 1420 may be electrically connected to the resonator 1410. More specifically, the fifth conductor 1481 of the feeder 1420 is connected to the first signal conducting portion 1431 of the resonator 1410, and the sixth conductor 1482 of the feeder 1420 is connected to the second signal conducting portion 1432 of the resonator 1410. Accordingly, the input current flows in both the resonator 1410 and the feeder 1420. The input current flows in a counterclockwise direction in the resonator 1410. The input current flowing in the resonator 1410 generates a magnetic field, and the magnetic field induces a current in the resonator 1410. The induced current flows in a clockwise direction in the resonator 1410 along the first transmission line of the resonator 1410. The induced current in the resonator 1410 transfers energy to the capacitor 1411 of the resonator 1410, and also generates a magnetic field. In FIG. 15A, the input current flowing in the feeder 1420 and the resonator 1410 is indicated by the solid lines with arrowheads, and the induced current flowing in the resonator 1410 is indicated by the dashed lines with arrowheads.

A direction of a magnetic field generated by a current is determined based on the right-hand rule. As illustrated in FIG. 15A, inside the feeder 1420, a direction 1521 of the magnetic field generated by the input current flowing in the feeder 1420 is the same as a direction 1523 of the magnetic field generated by the induced current flowing in the resonator 1410. Accordingly, the strength of the total magnetic field increases inside the feeder 1420.

In contrast, as illustrated in FIG. 15A, in a region between the feeder 1420 and the resonator 1410, a direction 1533 of a magnetic field generated by the input current flowing in the feeder 1420 is opposite to a direction 1531 of the magnetic field generated by the induced current flowing in the resonator 1410. Accordingly, the strength of the total magnetic field decreases in the region between the feeder 1420 and the resonator 1410.

Typically, in a resonator having a loop structure, a strength of a magnetic field decreases in the center of the resonator, and increases near an outer periphery of the resonator. However, referring to FIG. 15A, since the feeder 1420 is electrically connected to both ends of the capacitor 1411 of the resonator 1410, the direction of the induced current in the resonator 1410 is the same as the direction of the input current in the feeder 1420. Since the direction of the induced current in the resonator 1420 is the same as the direction of the input current in the feeder 1420, the strength of the total magnetic field increases inside the feeder 1420, and decreases outside the feeder 1420. As a result, due to the feeder 1420, the strength of the total magnetic field increases in the center of the resonator 1410 having the loop structure, and decreases near an outer periphery of the resonator 1410, thereby compensating for the normal characteristic of the resonator 1410 having the loop structure in which the magnetic field decreases in the center of the resonator 1410, and increases near an outer periphery of the resonator 1410. Thus, the strength of the total magnetic field may be constant inside the resonator 1410.

A power transmission efficiency for transferring a wireless power from a source resonator to a target resonator is proportional to the strength of the total magnetic field generated in the source resonator. Accordingly, when the strength of the total magnetic field increases inside the source resonator, the power transmission efficiency also increases.

Figure 15B:
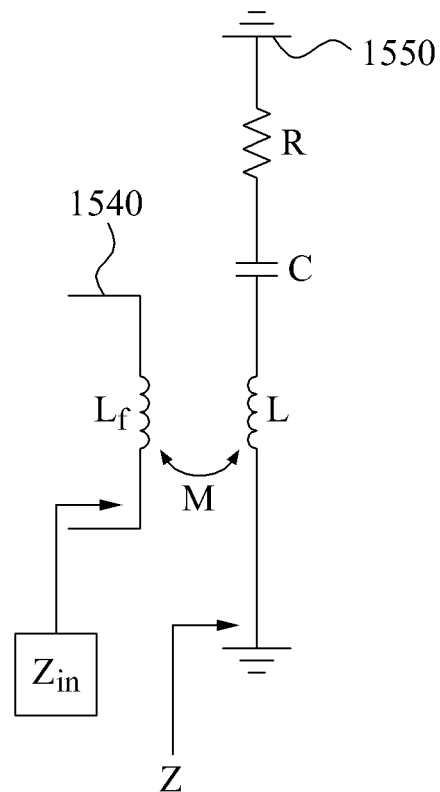
FIG. 15B is a diagram illustrating examples of equivalent circuits of a feeder and a resonator.

FIG. 15B is a diagram illustrating examples of equivalent circuits of a feeder and a resonator. Referring to FIG. 15B, a feeder 1540 and a resonator 1550 may be represented by the equivalent circuits in FIG. 15B. The feeder 1540 is represented as an inductor having an inductance $L_f$, and the resonator 1550 is represented as a series connection of an inductor having an inductance L coupled to the inductance $L_f$ of the feeder 1540 by a mutual inductance M, a capacitor having a capacitance C, and a resistor having a resistance R. An input impedance $Z_{in}$ viewed in a direction from the feeder 1540 to the resonator 1550 may be expressed by the following Equation 1:

$$Z_{in} = \frac{(\omega M)^2}{Z}$$

In Equation 1, M denotes a mutual inductance between the feeder 1540 and the resonator 1550, ω denotes a resonant frequency of the feeder 1540 and the resonator 1550, and Z denotes an impedance viewed in a direction from the resonator 1550 to a target. As can be seen from Equation 1, the input impedance $Z_{in}$ is proportional to the square of the mutual inductance M. Accordingly, the input impedance $Z_{in}$ may be adjusted by adjusting the mutual inductance M. The mutual inductance M depends on an area of a region between the feeder 1540 and the resonator 1550. The area of the region between the feeder 1540 and the resonator 1550 may be adjusted by adjusting a size of the feeder 1540, thereby adjusting the mutual inductance M and the input impedance $Z_{in}$. Since the input impedance $Z_{in}$ may be adjusted by adjusting the size of the feeder 1540, it may be unnecessary to use a separate matching network to perform impedance matching with an output impedance of a power amplifier.

If the resonator 1550 and the feeder 1540 in FIG. 15B are included in a wireless power reception apparatus, a magnetic field may be distributed as illustrated in FIG. 15A. In this case, the resonator 1550 may operate as a target resonator 1550, and may receive wireless power from a source resonator via magnetic coupling. The received wireless power induces a current in the target resonator 1550. The induced current in the target resonator 1550 generates a magnetic field, which induces a current in the feeder 1540. If the target resonator 1550 is connected to the feeder 1540 as illustrated in FIG. 15A, a direction of the induced current flowing in the resonator 1550 will be the same as a direction of the induced current flowing in the feeder 1540. Accordingly, for the reasons discussed above in connection with FIG. 15A, the strength of the total magnetic field will increase inside the feeder 1540, and will decrease in a region between the feeder 1540 and the target resonator 1550.

Figure 16:
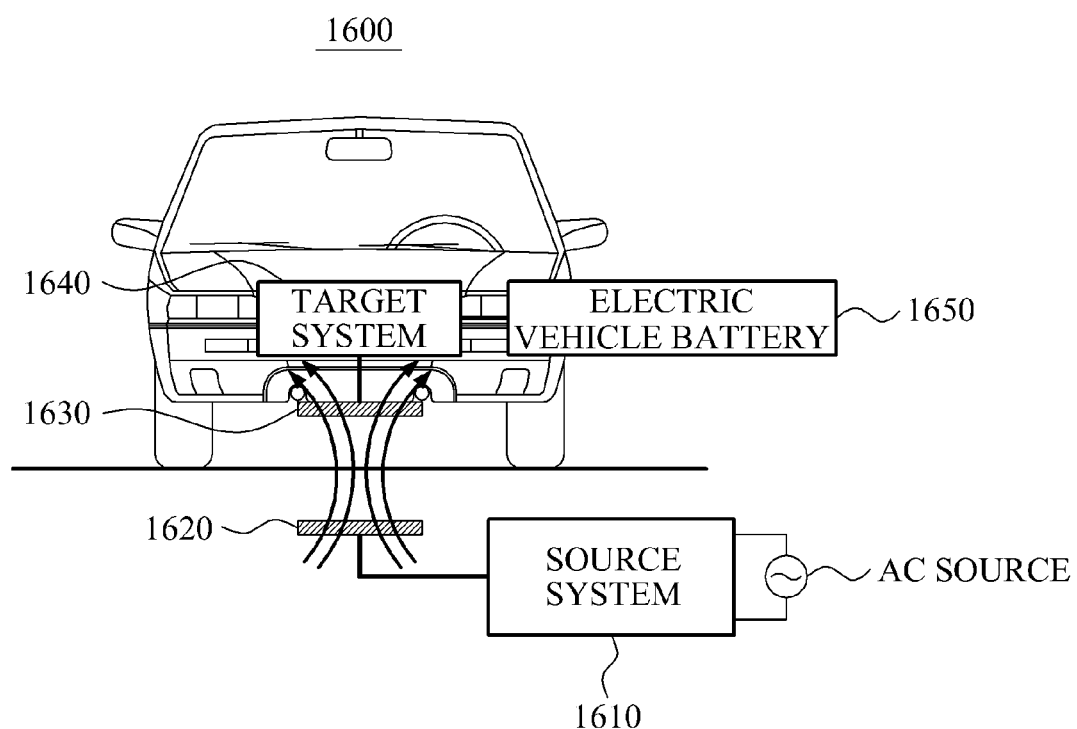
FIG. 16 is a diagram illustrating an example of an electric vehicle charging system.

FIG. 16 is a diagram illustrating an example of an electric vehicle charging system. Referring to FIG. 16, an electric vehicle charging system 1600 includes a source system 1610, a source resonator 1620, a target resonator 1630, a target system 1640, and an electric vehicle battery 1650.

In one example, the electric vehicle charging system 1600 has a structure similar to the structure of the wireless power transmission system of FIG. 1. The source system 1610 and the source resonator 1620 in the electric vehicle charging system 1600 operate as a source. The target resonator 1630 and the target system 1640 in the electric vehicle charging system 1600 operate as a target.

In one example, the source system 1610 includes a variable SMPS, a power detector, a power amplifier, a matching network, a TX controller, and a communication unit similar to those of the source 110 of FIG. 1. In one example, the target system 1640 includes a matching network, a rectifier, a voltage detector, a DC/DC converter, a power detector, a communication unit, and a RX controller similar to those of the target 120 of FIG. 1. The electric vehicle battery 1650 is charged by the target system 1640. The electric vehicle charging system 1600 may use a resonant frequency in a band of a few kilohertz (kHz) to tens of MHz to wirelessly transmit power.

The source system 1610 generates power based on a type of the vehicle being charged, a capacity of the electric vehicle battery 1650, and a charging state of the electric vehicle battery 1650, and wirelessly transmits the generated power to the target system 1640 via magnetic coupling between the source resonator 1620 and the target resonator 1630.

The source system 1610 may control an alignment of the source resonator 1620 and the target resonator 1630. For example, when the source resonator 1620 and the target resonator 1630 are not aligned, the TX controller of the source system 1610 may transmit a message to the target system 1640 to control the alignment of the source resonator 1620 and the target resonator 1630.

For example, when the target resonator 1630 is not located in a position enabling maximum magnetic coupling, the source resonator 1620 and the target resonator 1630 are not properly aligned. When a vehicle does not stop at a proper position to accurately align the source resonator 1820 and the target resonator 1830, the source system 1610 may instruct a position of the vehicle to be adjusted to control the source resonator 1620 and the target resonator 1630 to be aligned. However, this is just an example, and other methods of aligning the source resonator 1820 and the target resonator 1830 may be used.

The source system 1610 and the target system 1640 may transmit or receive an ID of a vehicle and exchange various messages by communicating with each other.

The descriptions of FIGS. 2 through 15B are also applicable to the electric vehicle charging system 1600. However, the electric vehicle charging system 1600 may use a resonant frequency in a band of a few kHz to tens of MHz, and may transmit power that is equal to or higher than tens of watts to charge the electric vehicle battery 1650.

The TX controller 114, the communication units 115, 124, 260, 460, 550, 616, and 624, the RX controller 125, the measurers 250, 450, 540, 615, and 623, the power controllers 270, 310, 490, and 619, the charging mode determiners 271 and 491, the pulse signal generators 273, 313, and 495, the offset calculators 311 and 493, the first comparators 470 and 617, the second comparators 480 and 618, the controller 560, the source system 1610, and the target system 1640 in FIGS. 1-6 and 16 described above that perform the operations illustrated in FIGS. 8 and 9 may be implemented using one or more hardware components, one or more software components, or a combination of one or more hardware components and one or more software components.

A hardware component may be, for example, a physical device that physically performs one or more operations, but is not limited thereto. Examples of hardware components include resistors, capacitors, inductors, power supplies, frequency generators, operational amplifiers, power amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various modifications may be made in these examples without departing from the spirit and scope of the claims and their equivalents. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:
1. A wireless power transmission apparatus comprising:
   a measurer configured to measure a first value of a current flowing in a source resonator;

a communication unit configured to receive a second value of a charging current of a battery from a wireless power reception apparatus; and a power controller configured to control an amount of power to be transmitted by the source resonator based on an internal offset and a power transmission efficiency offset, wherein the internal offset determined based on the first value and a reference current value that is distinct from the second value and the power transmission efficiency offset is determined based on the second value and the reference current value.

2. The apparatus of claim 1, wherein the power controller comprises:

a charging mode determiner configured to determine a charging mode of the battery based on a change in the second value; and a pulse signal generator configured to generate a pulse signal having a pulse width adjusted based on the determined charging mode of the battery.

3. The apparatus of claim 2, wherein the charging mode determiner is further configured to determine whether the charging mode of the battery is a constant current (CC) mode in which the value of the charging current of the battery is constant, or a constant voltage (CV) mode in which the value of the charging current of the battery is variable and a value of a charging voltage of the battery is constant.

4. The apparatus of claim 2, further comprising:

an alternating current-to-direct current (AC/DC) converter configured to convert an AC power supplied from a power supply to a DC power based on the pulse width of the pulse signal; and a DC-to-AC (DC/AC) converter configured to convert the DC power to an AC power based on a resonant frequency of the source resonator.

5. The apparatus of claim 1, wherein
the power controller comprises:
an offset calculator configured to calculate the power transmission efficiency offset; and
a pulse signal generator configured to generate a pulse signal having a pulse width adjusted based on the power transmission efficiency offset.

6. The apparatus of claim 1, wherein
the power controller comprises:
a charging mode determiner configured to determine a charging mode of the battery based on a change in the second value;
an offset calculator configured to calculate the power transmission efficiency offset; and
a pulse signal generator configured to generate a pulse signal having a pulse width adjusted based on the determined charging mode of the battery and the power transmission efficiency offset.

7. The apparatus of claim 6, further comprising:
a first comparator configured to compare the first value with a reference current value; and
a second comparator configured to compare the second value with the reference current value;
wherein the pulse signal generator is further configured to adjust the pulse width of the pulse signal based on a difference between a result of the comparing by the first comparator and a result of the comparing by the second comparator.

8. The apparatus of claim 1, wherein the communication unit is further configured to receive, from the wireless power reception apparatus, a value of a current flowing in a rectifier as the second value.

9. The apparatus of claim 1, wherein the wireless power reception apparatus is configured to receive power from a target resonator;
the source resonator comprises a coil;
the target resonator comprises a coil; and
a ratio of a number of turns of the coil of the source resonator to a number of turns of the coil of the target resonator is a 1:1 ratio.

10. A wireless power reception apparatus comprising:
a rectifier configured to rectify an alternating current (AC) power received from a wireless power transmission apparatus by a target resonator through a mutual resonance with a source resonator to a direct current (DC) power;
a measurer configured to measure a first value of a current flowing in the target resonator; and
a communication unit configured to transmit the first value to the wireless power transmission apparatus,
wherein the AC power is controlled by the wireless power transmission apparatus based on a power transmission efficiency offset and an internal offset, the power transmission efficiency offset determined based on the first value and the reference current value and the internal offset determined based on the reference current value and a second value which is a value of a current flowing in a source resonator.

11. The apparatus of claim 10, wherein the measurer is further configured to measure a third value of a current flowing from the rectifier into a battery; and
the communication unit is further configured to transmit the third value to the wireless power transmission apparatus.

12. The apparatus of claim 11, further comprising a controller configured to determine a charging mode of the battery based on a change in the third value.

13. The apparatus of claim 10, wherein the communication unit is further configured to communicate with the wireless power transmission apparatus using either one or both of an in-band communication scheme using a resonant frequency of the target resonator and an out-band communication scheme using a communication frequency differing from the resonant frequency.

14. A wireless power transmission method comprising:
measuring a first value of a current flowing in a source resonator;
receiving a second value of a charging current of a battery from a wireless power reception apparatus; and
controlling an amount of power to be transmitted by the source resonator based on an internal offset and a power transmission efficiency offset, wherein the internal offset determined based on the first value and a reference current value that is distinct from the second value and the power transmission efficiency offset is determined based on the second value and the reference current value.

15. The method of claim 14, wherein the controlling comprises:
determining a charging mode of the battery based on a change in the second value; and
generating a pulse signal having a pulse width adjusted based on the determined charging mode of the battery.

16. The method of claim 15, further comprising:
converting an alternating current (AC) power supplied from a power supply to a direct current (DC) power based on the pulse width of the pulse signal; and
converting the DC power to an AC power based on a resonant frequency of the source resonator.

17. The method of claim 14, wherein
the controlling comprises:
calculating the power transmission efficiency offset; and
generating a pulse signal having a pulse width adjusted based on the power transmission efficiency offset.

18. The method of claim 14,
wherein the controlling comprises:
determining a charging mode of the battery based on a change in the second value;
calculating a power transmission efficiency offset; and
generating a pulse signal having a pulse width adjusted based on the determined charging mode of the battery and calculated power transmission efficiency offset.

19. A wireless power transmission apparatus comprising:
a measurer configured to measure a first information indicative of an amount of power being transmitted by a source resonator;
a communication unit configured to receive, from a wireless power reception apparatus, measured a second information indicative of an amount of power being consumed by a load powered by the wireless reception apparatus; and
a controller configured to control an amount of power to be transmitted by the source resonator based on an internal offset and a power transmission efficiency offset, wherein the internal offset determined based on the first value and a reference current value that is distinct from the second value and the power transmission efficiency offset is determined based on the second value and the reference current value.

* * * * *